US011873720B2

(12) United States Patent
Sasaki et al.

(10) Patent No.: US 11,873,720 B2
(45) Date of Patent: Jan. 16, 2024

(54) METHOD OF CENTER GUIDE PIN, MANUFACTURING METHOD OF CENTER GUIDE PIN, AND ASSEMBLING METHOD OF ROTARY MACHINE

(71) Applicant: MITSUBISHI HEAVY INDUSTRIES COMPRESSOR CORPORATION, Tokyo (JP)

(72) Inventors: Yuichi Sasaki, Hiroshima (JP); Yasuhiko Kawamura, Hiroshima (JP); Hirotoshi Abo, Hiroshima (JP); Kenichi Nishiyama, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 85 days.

(21) Appl. No.: 17/805,112

(22) Filed: Jun. 2, 2022

(65) Prior Publication Data

US 2022/0403750 A1 Dec. 22, 2022

(30) Foreign Application Priority Data

Jun. 16, 2021 (JP) ................................ 2021-100058

(51) Int. Cl.
*F01D 11/00* (2006.01)
*F01D 11/02* (2006.01)

(52) U.S. Cl.
CPC ............ *F01D 11/02* (2013.01); *F01D 11/001* (2013.01); *F05D 2230/30* (2013.01); *F05D 2230/60* (2013.01); *F05D 2230/64* (2013.01); *F05D 2260/81* (2013.01)

(58) Field of Classification Search
CPC ...... F01D 11/02; F01D 11/001; F01D 25/246; F01D 25/265; F05D 2230/30; F05D 2230/60; F05D 2230/64; F05D 2260/81; F05D 2220/31; F05D 2230/51; F05D 2230/61; F05D 2250/294; F05D 2270/8041
See application file for complete search history.

(56) References Cited

U.S. PATENT DOCUMENTS

2018/0142571 A1 5/2018 Mizumi et al.
2021/0332722 A1 * 10/2021 Terada .................... F01D 25/28

FOREIGN PATENT DOCUMENTS

EP 3239470 A2 11/2017
JP 6802351 B2 12/2020
WO 2021/086208 A1 5/2021

* cited by examiner

*Primary Examiner* — Lee A Holly
(74) *Attorney, Agent, or Firm* — Osha Bergman Watanabe & Burton LLP

(57) ABSTRACT

A design method of a center guide pin includes a step of setting a virtual center axis of a casing, a step of acquiring a center position of the center guide pin in a horizontal direction, a step of acquiring, as a first offset amount, an offset amount of the center position of the center guide pin from the virtual center axis of the casing in the horizontal direction, a step of setting a virtual center axis of a diaphragm, a step of acquiring a center position of a groove portion in the horizontal direction, a step of acquiring, as a second offset amount, an offset amount of the center position of the groove portion from the virtual center axis of the diaphragm in the horizontal direction, and a step of designing the center guide pin based on the first offset amount and the second offset amount.

9 Claims, 15 Drawing Sheets

METHOD OF CENTER GUIDE PIN, MANUFACTURING METHOD OF CENTER GUIDE PIN, AND ASSEMBLING METHOD OF ROTARY MACHINE

BACKGROUND OF THE INVENTION

Field of the Invention

The present disclosure relates to a design method of a center guide pin, a manufacturing method of a center guide pin, and an assembling method of a rotary machine.

Priority is claimed on Japanese Patent Application No. 2021-100058, filed Jun. 16, 2021, the content of which is incorporated herein by reference.

Description of Related Art

In a rotary machine such as a steam turbine and a compressor, there is a structure having a rotor that is rotatable about an axis and has turbine blades, a casing that covers the rotor, and a diaphragm that is disposed between the casing and the rotor and has a plurality of turbine stationary blades (nozzles) around the rotor on an upstream side of the turbine blades. In such a rotary machine, it is necessary to position the diaphragm such that the position of the diaphragm in a horizontal direction intersecting the axis is within a tolerance determined with respect to the casing that rotatably supports the rotor.

As a structure for positioning the diaphragm with respect to the casing, for example, Japanese Patent No. 6802351 discloses a configuration of a steam turbine provided with a center guide pin. The steam turbine of Japanese Patent No. 6802351 includes a rotor, a casing, a diaphragm, and a center guide pin. In this configuration, the casing extends in a circumferential direction of the rotor and is vertically divided by a horizontal plane. The diaphragm is disposed between the casing and the rotor, extends in the circumferential direction of the rotor, and is vertically divided by a horizontal plane. The center guide pin positions the diaphragm with respect to the casing in the horizontal direction perpendicular to the axis. The center guide pin is fitted into a groove portion formed on an outer peripheral surface of the diaphragm. The groove portion is disposed at each of a vertically upward position and a vertically downward position of the axis, and extends in an axial direction.

CITATION LIST

Patent Literature

[Patent Document 1]
Japanese Patent No. 6802351

SUMMARY OF THE INVENTION

By the way, in the configuration disclosed in Japanese Patent No. 6802351, it is necessary to temporarily assemble the diaphragm to the casing many times when assembling the rotary machine. Specifically, first, in a state where the diaphragm is placed on the casing, gaps between the diaphragm and the casing on both sides in the horizontal direction are measured. After that, the diaphragm is removed from the casing. Next, the offset amount of the center guide pin from the groove portion is adjusted such that the gaps between the diaphragm and the casing on both sides in the horizontal direction are within a target range. The diaphragm is mounted again on the casing such that the center guide pin adjusted in the offset amount is disposed inside the groove portion. In this way, in order to adjust the position of the diaphragm with respect to the casing in the horizontal direction, it is necessary to move the diaphragm, which is a heavy object, with respect to the casing many times. Therefore, there has been a problem that it takes a great deal of time and effort to mount the diaphragm in alignment with the casing.

The present disclosure provides a design method of a center guide pin, a manufacturing method of a center guide pin, and an assembling method of a rotary machine, by which a diaphragm is easily aligned with a casing to improve work efficiency.

A design method of a center guide pin according to the present disclosure is a design method of a center guide pin of a rotary machine that includes a rotor, a casing, a diaphragm, a groove portion, and the center guide pin, the rotor being rotatable about an axis, the casing extending in a circumferential direction of the rotor and being vertically separable by a casing dividing surface which is a horizontal plane, the diaphragm being disposed between the casing and the rotor, extending in the circumferential direction of the rotor, and being vertically separable by a diaphragm dividing surface which is a horizontal plane, the groove portion being formed on an outer peripheral surface of the diaphragm so as to extend in an axial direction in which the axis extends, and the center guide pin being fixed to an inner peripheral surface of the casing facing the outer peripheral surface of the diaphragm and capable of positioning the diaphragm with respect to the casing in a horizontal direction orthogonal to the axial direction by being fitted into the groove portion, the design method including: a step of acquiring a plurality of center points of the casing when viewed from the axial direction by measuring the inner peripheral surface of the casing by three-dimensional measurement at a plurality of measurement positions spaced apart from each other in the axial direction, and setting a virtual center axis of the casing based on the plurality of center points of the casing; a step of acquiring a center position of the center guide pin in the horizontal direction by measuring an outer shape of the center guide pin by three-dimensional measurement; a step of acquiring, as a first offset amount, an offset amount of the center position of the center guide pin from the virtual center axis of the casing in the horizontal direction; a step of acquiring a center point of the diaphragm when viewed from the axial direction by measuring the outer peripheral surface of the diaphragm by three-dimensional measurement, and setting a virtual center axis of the diaphragm based on the center point of the diaphragm; a step of acquiring a center position of the groove portion in the horizontal direction by measuring the shape of the groove portion by three-dimensional measurement; a step of acquiring, as a second offset amount, an offset amount of the center position of the groove portion from the virtual center axis of the diaphragm in the horizontal direction; and a step of designing the center guide pin based on the first offset amount and the second offset amount such that a position of the diaphragm in the horizontal direction in a state where the diaphragm is incorporated in the casing is within a tolerance determined with respect to the casing.

A manufacturing method of a center guide pin according to the present disclosure includes a step of manufacturing the center guide pin designed by the design method of a center guide pin described above.

An assembling method of a rotary machine according to the present disclosure includes: a step of fixing the center guide pin manufactured by the manufacturing method of a center guide pin described above to the inner peripheral surface of the casing; and a step of assembling the diaphragm on which the groove portion is formed to the casing and fitting the center guide pin into the groove portion.

Advantageous Effects of Invention

According to a design method of a center guide pin, a manufacturing method of a center guide pin, and an assembling method of a rotary machine of the present disclosure, a diaphragm is easily aligned with a casing of a diaphragm, so that work efficiency can be improved.

DETAILED DESCRIPTION OF THE INVENTION

Hereinafter, embodiments for carrying out a design method of a center guide pin, a manufacturing method of a center guide pin, and a manufacturing method of a rotary machine according to the present disclosure will be described with reference to the attached drawings. However, the present disclosure is not limited to this embodiment.

(Configuration of Steam Turbine (Rotary Machine))

Figure 1:
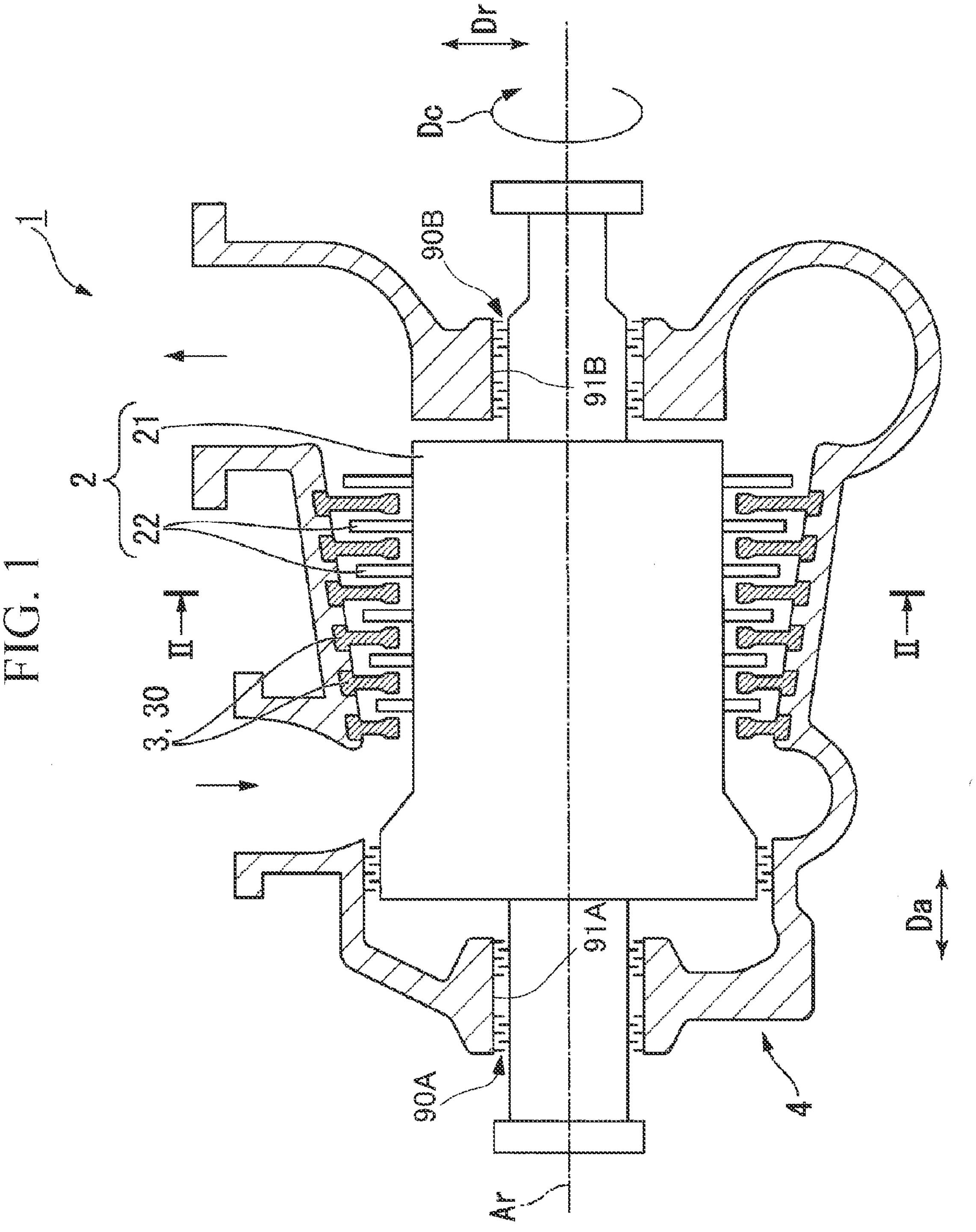
FIG. 1 is a cross-sectional view showing a schematic configuration of a steam turbine to which a design method of a center guide pin, a manufacturing method of a center guide pin, and an assembling method of a rotary machine according to an embodiment of the present disclosure are applied.
Figure 2:
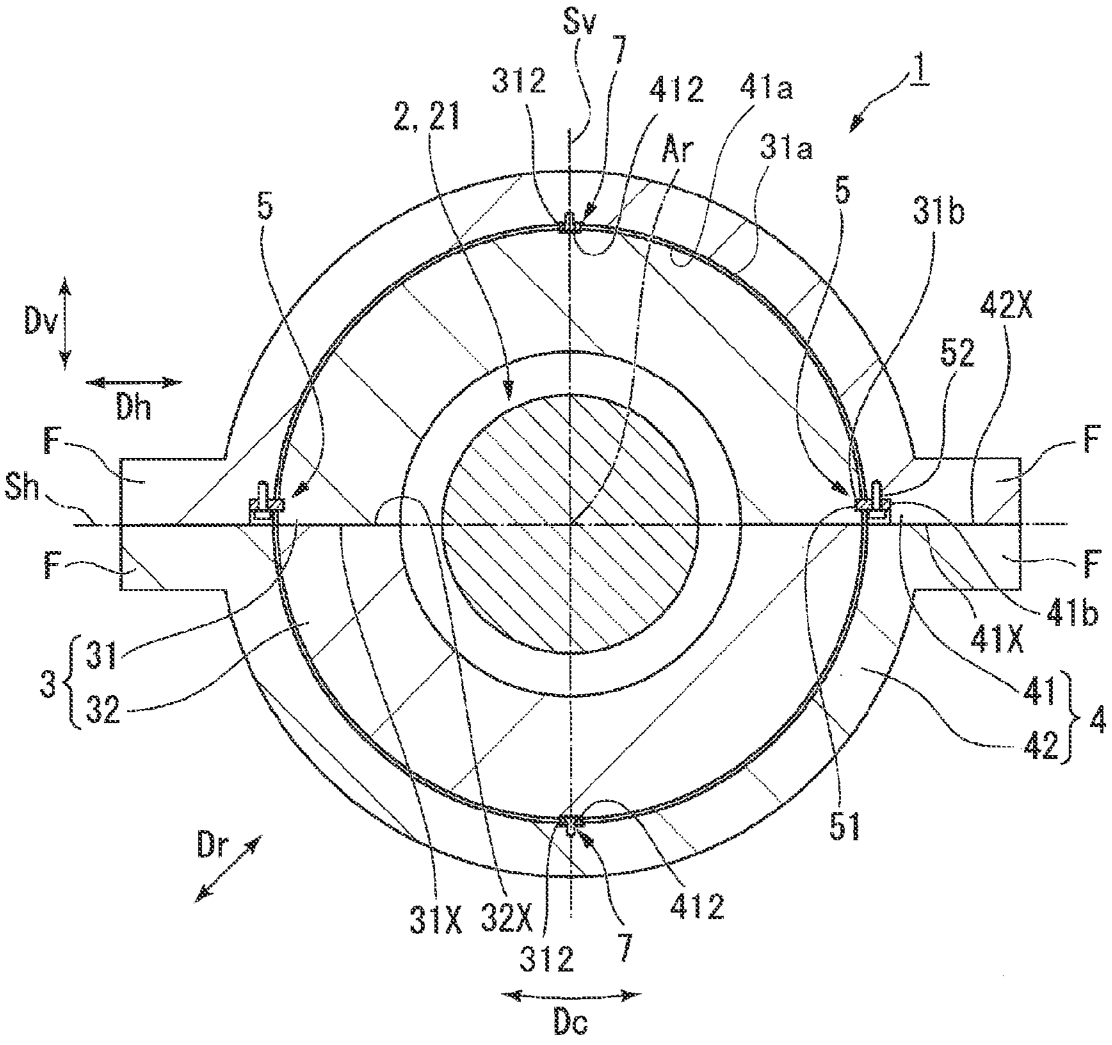
FIG. 2 is a cross-sectional view taken along the line II-II of FIG. 1.

As shown in FIGS. 1 and 2, a steam turbine 1 which is a rotary machine in the present embodiment includes a rotor 2, a casing 4, a diaphragm 3, a vertical position defining portion 5 (see FIG. 2), and a center guide pin 7 (see FIG. 2).

The rotor 2 is rotatable about an axis Ar. In the following description, a direction in which the axis line Ar extends is defined as an axial direction Da. A radial direction of the rotor 2 (steam turbine 1) centered on the axis Ar is simply defined as a radial direction Dr. One in the radial direction Dr perpendicular to the axis Ar is defined as a vertical direction Dv. A direction orthogonal to the vertical direction Dv in the radial direction Dr perpendicular to the axis Ar is defined as a horizontal direction Dh. A direction around the rotor 2 centered on the axis Ar is defined as a circumferential direction Dc of the rotor 2 (steam turbine 1).

The rotor 2 includes a rotor shaft 21 and a plurality of stages of turbine blades 22. The rotor shaft 21 is formed in a columnar shape centered on the axis Ar and extends in the axial direction Da. The plurality of stages of turbine blades 22 are disposed at intervals in the axial direction Da. The turbine blades 22 of each stage extend from the rotor shaft 21 toward an outside of the radial direction Dr. The turbine blades 22 of each stage are fixed to an outer peripheral surface of the rotor shaft 21. The turbine blades 22 of each stage are disposed side by side in the circumferential direction Dc centered on the axis Ar.

The casing 4 is formed so as to cover the rotor 2 from the outside of the radial direction Dr. More specifically, the casing 4 is formed in a cylindrical shape extending in the circumferential direction Dc about the axis Ar. As shown in FIG. 2, the casing 4 is vertically divided by a horizontal plane Sh which is a plane perpendicular to the vertical direction Dv to include the axis Ar. The casing 4 includes two half casings, an upper half casing (casing) 41 disposed above the axis Ar in the vertical direction Dv and a lower half casing (casing) 42 disposed below the axis Ar in the vertical direction Dv.

The upper half casing 41 includes casing dividing surfaces 41X being the horizontal plane Sh extending in the horizontal direction Dh at both ends of the circumferential direction Dc. Similarly, the lower half casing 42 includes casing dividing surfaces 42X being the horizontal plane Sh expanding in the horizontal direction Dh at both ends of the circumferential direction Dc. The upper half casing 41 and the lower half casing 42 include flange portions F that project so as to extend the casing dividing surfaces 41X and 42X to an outside in the horizontal direction Dh. The flange portion F of the upper half casing 41 and the flange portion F of the lower half casing 42 are fixed by a fastening member (not shown), such as a bolt and a nut, in a state where the casing dividing surface 41X of the upper half casing 41 and the casing dividing surface 42X of the lower half casing 42 are made to abut on each other.

The diaphragm 3 is disposed between the casing 4 and the rotor 2. A plurality of the diaphragm 3 are disposed at intervals in the axial direction Da. Each of the plurality of diaphragms 3 is formed so as to extend in the circumferential direction Dc. Each of the plurality of diaphragms 3 is formed in an annular shape centered on the axis Ar, which covers the rotor 2 from the outside of the radial direction Dr. The diaphragm 3 is disposed apart from the turbine blades 22 of each stage on one side (upstream side) of the axial direction Da. The diaphragm 3 includes a plurality of turbine stationary blades (nozzles) 30 (not shown in FIG. 2) that rectify the steam supplied to the turbine blades 22. These turbine stationary blades 30 are disposed side by side in the circumferential direction Dc centered on the axis Ar.

The diaphragm 3 is vertically divided by a horizontal plane Sh. The diaphragm 3 includes two half diaphragms, an upper half diaphragm 31 disposed above the axis Ar in the vertical direction Dv and a lower half diaphragm 32 disposed below the axis Ar in the vertical direction Dv. The upper half diaphragm 31 includes diaphragm dividing surfaces 31X being the horizontal plane Sh at both ends of the circumferential direction Dc. The upper half diaphragm 31 can be housed inside the upper half casing 41. Similarly, the lower half diaphragm 32 includes diaphragm dividing surfaces 32X being the horizontal plane Sh at both end portions of the circumferential direction Dc. The lower half diaphragm 32 can be housed inside the lower half casing 42.

As shown in FIG. 1, the steam turbine 1 includes seal members 90A and 90B at both end portions of the axial direction Da in order to seal a space between an inner peripheral surface of the casing 4 and an outer peripheral surface of the rotor 2. The seal members 90A and 90B are disposed outside the axial direction Da with respect to the diaphragm 3 and the turbine blades 22. The seal members 90A and 90B are fixed to seal fixing surfaces 91A and 91B formed on the inner peripheral surface of the casing 4.

As shown in FIG. 2, a groove portion 312 extending in the axial direction Da is formed on an outer peripheral surface of the diaphragm 3. The groove portion 312 is formed in the upper half diaphragm 31 and the lower half diaphragm 32. The groove portion 312 is formed at the uppermost portion (upper top portion) in the vertical direction Dv on an outer peripheral surface 31*a* of the upper half diaphragm 31. In addition, the groove portion 312 is formed at the lowermost portion (lower top portion) in the vertical direction Dv on an outer peripheral surface of the lower half diaphragm 32. The groove portion 312 is formed in the same shape with respect to the upper half diaphragm 31 and the lower half diaphragm 32. Therefore, in the present embodiment, the groove portion 312 formed in the upper half diaphragm 31 will be described as an example.

Figure 3:
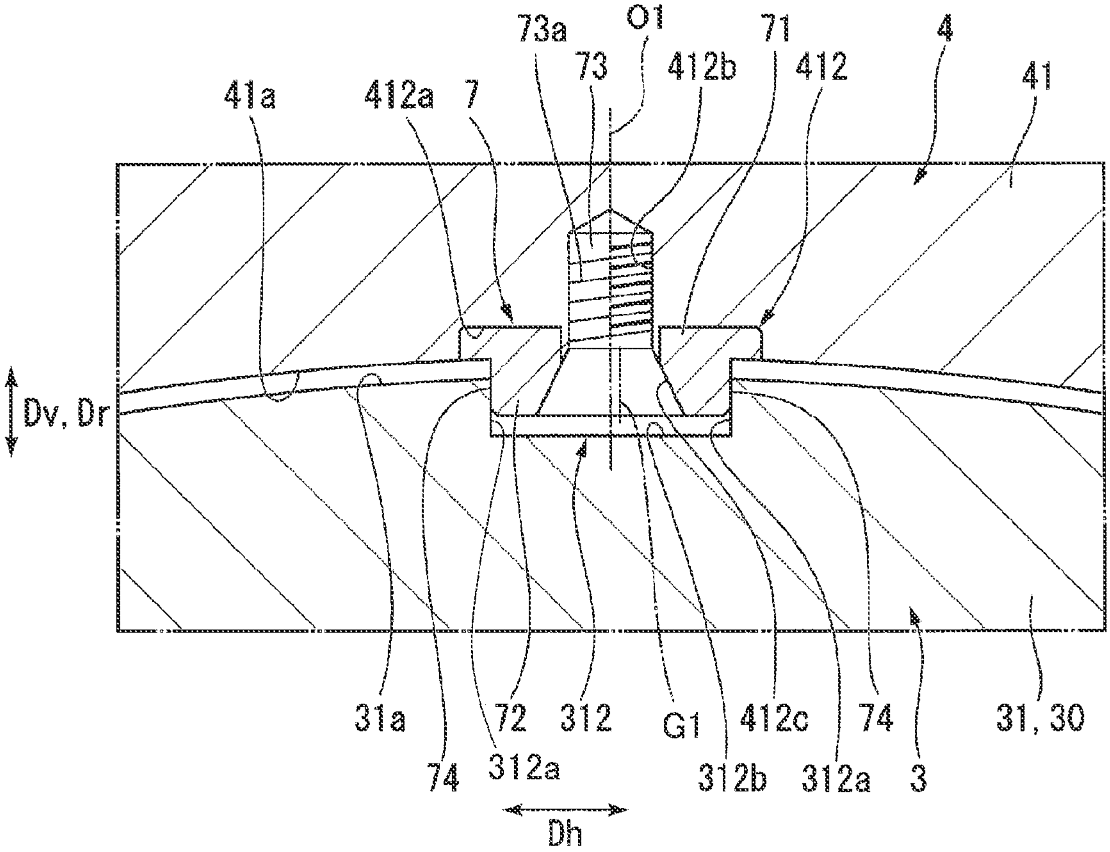
FIG. 3 is an enlarged view of a center guide pin disposed between an upper half casing and an upper half diaphragm in FIG. 2.

As shown in FIG. 3, the groove portion 312 is recessed in a U-shaped cross section from the outer peripheral surface 31*a* of the upper half diaphragm 31. The groove portion 312 extends in the axial direction Da. That is, the groove portion 312 is formed so as to pass through both surfaces of the upper half diaphragm 31 in the axial direction Da. The groove portion 312 of the present embodiment includes two inner side surfaces 312*a* and a bottom surface 312*b*. The two inner side surfaces 312*a* are planes expanding in the vertical direction Dv and the axial direction Da and facing each other in the horizontal direction Dh. The bottom surface 312*b* is a plane expanding in the horizontal direction Dh and the axial direction Da, which connects the two inner side surfaces 312*a* inside the radial direction Dr.

A pin mounting portion 412 capable of mounting the center guide pin 7 is formed on the inner peripheral surface 41*a* of the upper half casing 41 or the inner peripheral surface of the lower half casing 42 facing the groove portion 312. The pin mounting portion 412 includes a recess portion 412*a* and a female screw portion 412*b*. A pin base portion 71, which will be described below, of the center guide pin 7 can be inserted into the recess portion 412*a*. The female screw portion 412*b* is screwed with a male screw portion 73*a* of a fastening member 73 for fixing the center guide pin 7 to the upper half casing 41 or the lower half casing 42.

As shown in FIG. 2, the vertical position defining portion 5 positions the upper half diaphragm 31 in the vertical direction Dv with respect to the upper half casing 41. The vertical position defining portion 5 is disposed in the upper half casing 41 near the casing dividing surfaces 41X at both ends of the circumferential direction Dc. The vertical position defining portion 5 defines relative positions of both end portions of the upper half casing 41 in the circumferential direction Dc and both end portions of the upper half diaphragm 31 in the circumferential direction Dc.

The vertical position defining portion 5 includes a upper half diaphragm support 51 and a bolt 52. A mounting recess portion 41*b* for mounting the vertical position defining portion 5 is formed in the upper half casing 41, and an insertion recess portion 31*b* into which an end portion of the upper half diaphragm support 51 is inserted is formed in the upper half diaphragm 31. The upper half diaphragm support 51 can be fixed by the bolt 52 in the mounting recess portion 41*b*. The end portion of the upper half diaphragm support 51 projects from the mounting recess portion 41*b* toward the upper half diaphragm 31. The end portion of the upper half diaphragm support 51 is inserted into the insertion recess portion 31*b*. The insertion recess portion 31*b* restricts the movement of the inserted end portion of the upper half diaphragm support 51 in the vertical direction Dv.

The center guide pin 7 is a member for positioning the diaphragm 3 with respect to the casing 4 in the horizontal direction Dh orthogonal to the axial direction Da and the vertical direction Dv. The center guide pin 7 is fixed to the inner peripheral surface of the casing 4 facing the outer peripheral surface of the diaphragm 3. The center guide pin 7 can be fitted into the groove portion 312. More specifically, the center guide pin 7 enables positioning of a half diaphragm (semi-annular diaphragm) which is the upper half diaphragm 31 or the lower half diaphragm 32 with respect to a half casing (semi-cylindrical casing) which is the upper half casing 41 or the lower half casing 42 in the horizontal direction Dh. The center guide pin 7 is disposed between the upper half diaphragm 31 and the upper half casing 41 at an upper part in the vertical direction Dv, and is disposed between the lower half diaphragm 32 and the lower half casing 42 at a lower part in the vertical direction Dv. In other words, the center guide pins 7 are disposed on a vertical line Sv (see FIG. 2) that passes through the axis Ar, when viewed from the axial direction Da. The configuration of the center guide pin 7 disposed between the upper half casing 41 and the upper half diaphragm 31 and the configuration of the center guide pin 7 disposed between the lower half casing 42 and the lower half diaphragm 32 are the same as each other. Therefore, in the present embodiment, the center guide pin 7 disposed between the upper half casing 41 and the upper half diaphragm 31 will be described as an example.

As shown in FIG. 3, the center guide pin 7 is fixed to the inner peripheral surface 41*a* of the upper half casing 41 facing the outer peripheral surface 31*a* of the upper half diaphragm 31. The center guide pin 7 is mounted on the pin mounting portion 412. The center guide pin 7 of the present embodiment includes a pin base portion 71 and a positioning portion 72. The pin base portion 71 is housed in the recess portion 412*a* of the pin mounting portion 412. The pin base portion 71 is formed in a disk shape centered on a pin axis O1. Here, the pin axis O1 is an axis extending in the vertical direction Dv. The pin axis O1 overlaps a center axis of a hole 412*c* through which the fastening member 73 for mounting the center guide pin 7 on the upper half casing 41 passes. The recess portion 412*a* of the pin mounting portion 412 forms a disk-shaped space slightly larger than the pin base portion 71. As a result, the pin base portion 71 is housed in the recess portion 412*a*, whereby the position of the center guide pin 7 with respect to the upper half casing 41 is defined.

Figure 4:
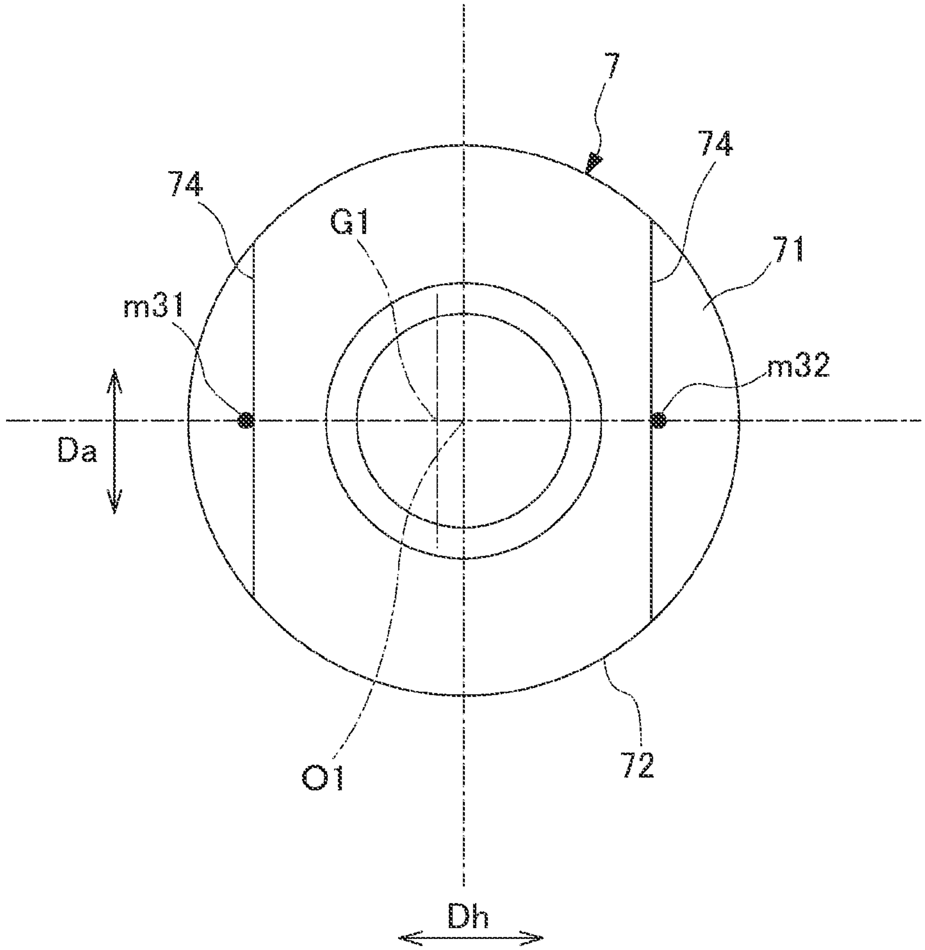
FIG. 4 is a plan view of a center guide pin.

The positioning portion 72 is disposed inside the groove portion 312 of the upper half casing 41 in a state where the pin base portion 71 is housed in the recess portion 412*a* and the center guide pin 7 is fixed to the upper half casing 41. As shown in FIGS. 3 and 4, the positioning portion 72 has a pair of positioning surfaces 74 on both sides of the horizontal direction Dh in a state where the center guide pin 7 is fixed to the upper half casing 41. The pair of positioning surfaces 74 are parallel to each other and expand in the axial direction Da and the vertical direction Dv so as to be orthogonal to the horizontal direction Dh. An interval between the pair of positioning surfaces 74 in the horizontal direction Dh is formed to be slightly smaller than a width of the groove portion 312 described above. As a result, the positioning portion 72 is fitted into the groove portion 312. In this case, the pair of positioning surfaces 74 simultaneously abut the two inner side surfaces 312*a* of the groove portion 312. When the positioning portion 72 is fitted into the groove portion 312, a slight gap may be formed due to a groove width of the groove portion 312 and a processing tolerance of a positioning surface of the positioning portion 72. Even in such a case, the gap has an acceptable size so as not to affect the offset amount of the casing and the diaphragm. As a result, movement of the upper half diaphragm 31 having the groove portion 312 in the horizontal direction Dh with respect to the upper half casing 41 is regulated. That is, the center guide pin 7 positions the upper half diaphragm 31 in the horizontal direction Dh with respect to the upper half casing 41. In addition, even in this state, the upper half diaphragm 31 having the groove portion 312 is allowed to move in the axial direction Da in which the groove portion 312 extends along the pair of positioning surfaces 74 with respect to the upper half casing 41.

As shown in FIG. 3, the center guide pin 7 adjusts the position of the upper half diaphragm 31 (diaphragm 3) in the horizontal direction Dh with respect to the upper half casing 41 (casing 4) by offsetting the center position of the positioning portion 72 in the horizontal direction Dh (hereinafter, this is referred to as the center position G1 of the center guide pin 7) from the pin axis O1 in the horizontal direction Dh. In the present embodiment, the center position of the positioning portion 72 in the horizontal direction Dh is a position at which distances from the pair of positioning surfaces 74 are equal to each other in the horizontal direction Dh.

Next, a design method S100 of the center guide pin and a manufacturing method S200 of the center guide pin will be described. Also in the following description, the configuration of the center guide pin 7 disposed between the upper half casing 41 and the upper half diaphragm 31 and the configuration of the center guide pin 7 disposed between the lower half casing 42 and the lower half diaphragm 32 are the same as each other. Therefore, a design method and a manufacturing method for the center guide pin 7 disposed between the upper half casing 41 and the upper half diaphragm 31 will be described as an example.

(Design Method of Center Guide Pin)

Figure 5:
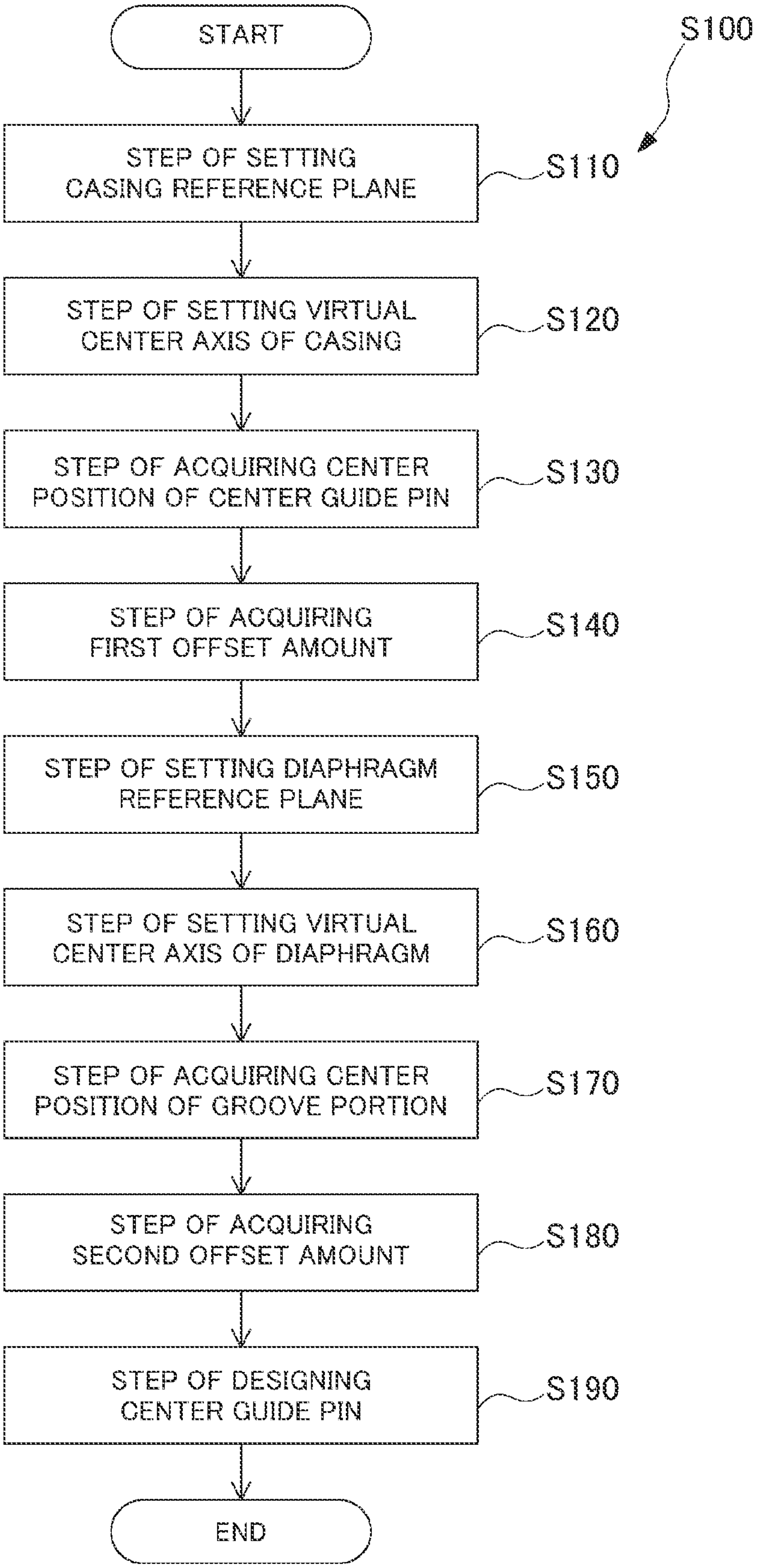
FIG. 5 is a flowchart showing a procedure of the design method of a center guide pin according to the embodiment of the present disclosure.

In the design method S100 of the center guide pin, the shape of the center guide pin 7 is designed based on a result of three-dimensional measurement using a three-dimensional measuring machine. In the three-dimensional measurement of the present embodiment, for example, a plurality of points on a surface of a component are measured to acquire a virtual center axis, a reference plane, and the like. As shown in FIG. 5, the design method S100 of the center guide pin includes a step S110 of setting a casing reference plane, a step S120 of setting a virtual center axis of the casing, a step S130 of acquiring the center position of the center guide pin, a step S140 of acquiring a first offset amount, a step S150 of setting a diaphragm reference plane, a step S160 of setting a virtual center axis of the diaphragm, a step S170 of acquiring the center position of the groove portion, a step S180 of acquiring a second offset amount, and a step S190 of designing the center guide pin.

Figure 6:
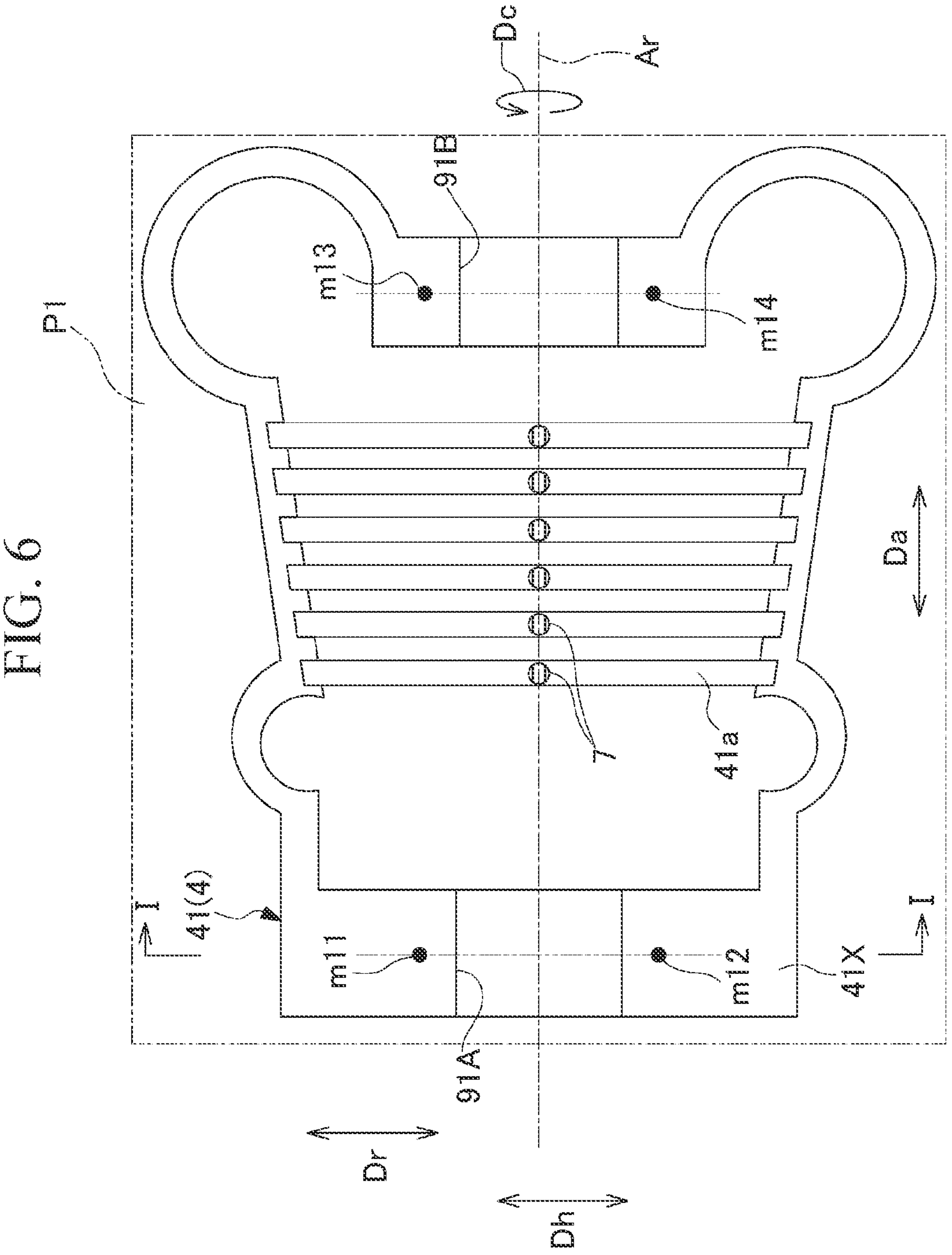
FIG. 6 is a plan view showing measurement points of three-dimensional measurement in a step of setting a casing reference plane.
Figure 7:
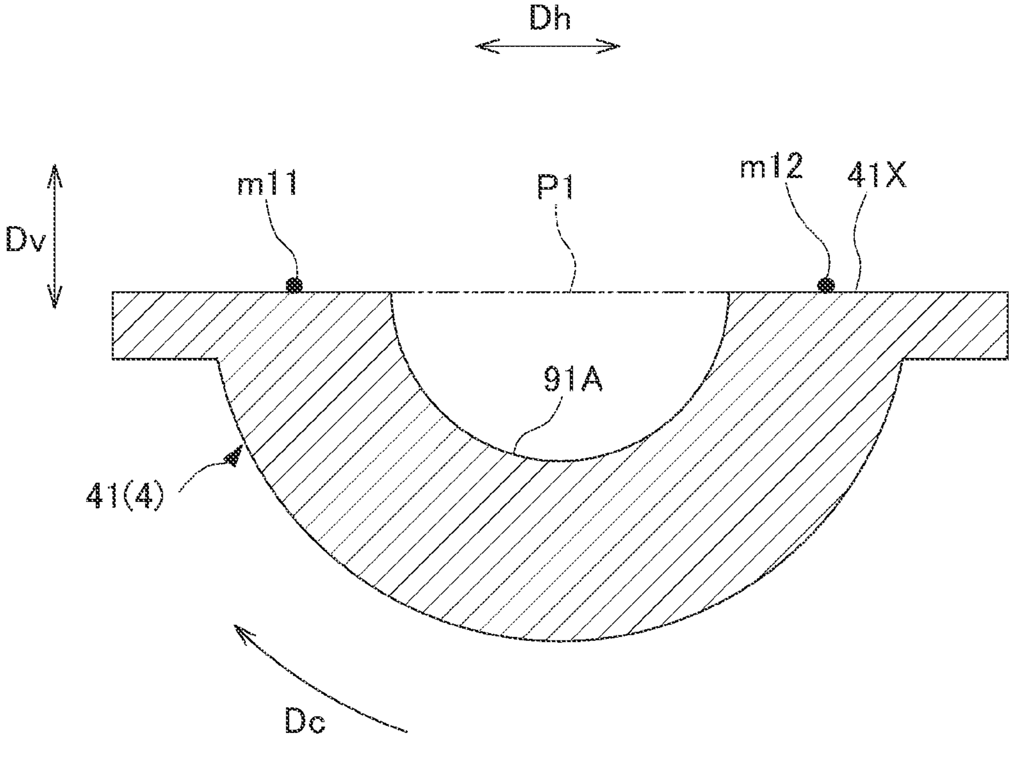
FIG. 7 is a cross-sectional view taken along the line I-I of FIG. 6.

In the step S110 of setting the casing reference plane, the casing dividing surface 41X of the upper half casing 41 is measured by three-dimensional measurement. Specifically, as shown in FIGS. 6 and 7, the positions of three or more measurement points in total are measured by three-dimensional measurement at a plurality of locations separated in the axial direction Da on the casing dividing surface 41X. The measurement position described below refers to a position of the measurement point measured by three-dimensional measurement. In the present embodiment, measurements are performed at two locations separated in the axial direction Da on the casing dividing surface 41X. Specifically, the casing dividing surface 41X is measured by three-dimensional measurement at the positions of measurement points m11 and m12, which are two points separated in the horizontal direction Dh across the seal fixing surface 91A, and measurement points m13 and m14, which are two points separated in the horizontal direction Dh across the seal fixing surface 91B. Here, it is preferable that the two measurement points m11 and m12 have substantially the same position in the axial direction Da on the casing dividing surface 41X. Similarly, it is preferable that the two measurement points m13 and m14 have substantially the same position in the axial direction Da on the casing dividing surface 41X. Based on the four measured measurement points m11 to m14, the casing reference plane P1 which is a virtual plane on the casing dividing surface 41X is set as a virtual plane including the measurement points m11 to m14. That is, the casing reference plane P1 parallel to the casing dividing surface 41X is set.

Here, although the position measurement is performed at the four measurement points m11 to m14, the measurement result of the casing dividing surface 41X at least three or more measurement points need only be obtained so that the virtual plane can be defined. In addition, the casing reference plane P1 may be set with higher accuracy by further increasing the number of the measurement points. When increasing the number of the measurement points, the number of the measurement locations (casing dividing surface 41X) having different positions in the axial direction Da may be increased to three or more, and the number of the measurement points at locations (casing dividing surface 41X) at which the positions in the axial direction Da are the same may be increased to three or more.

Figure 8:
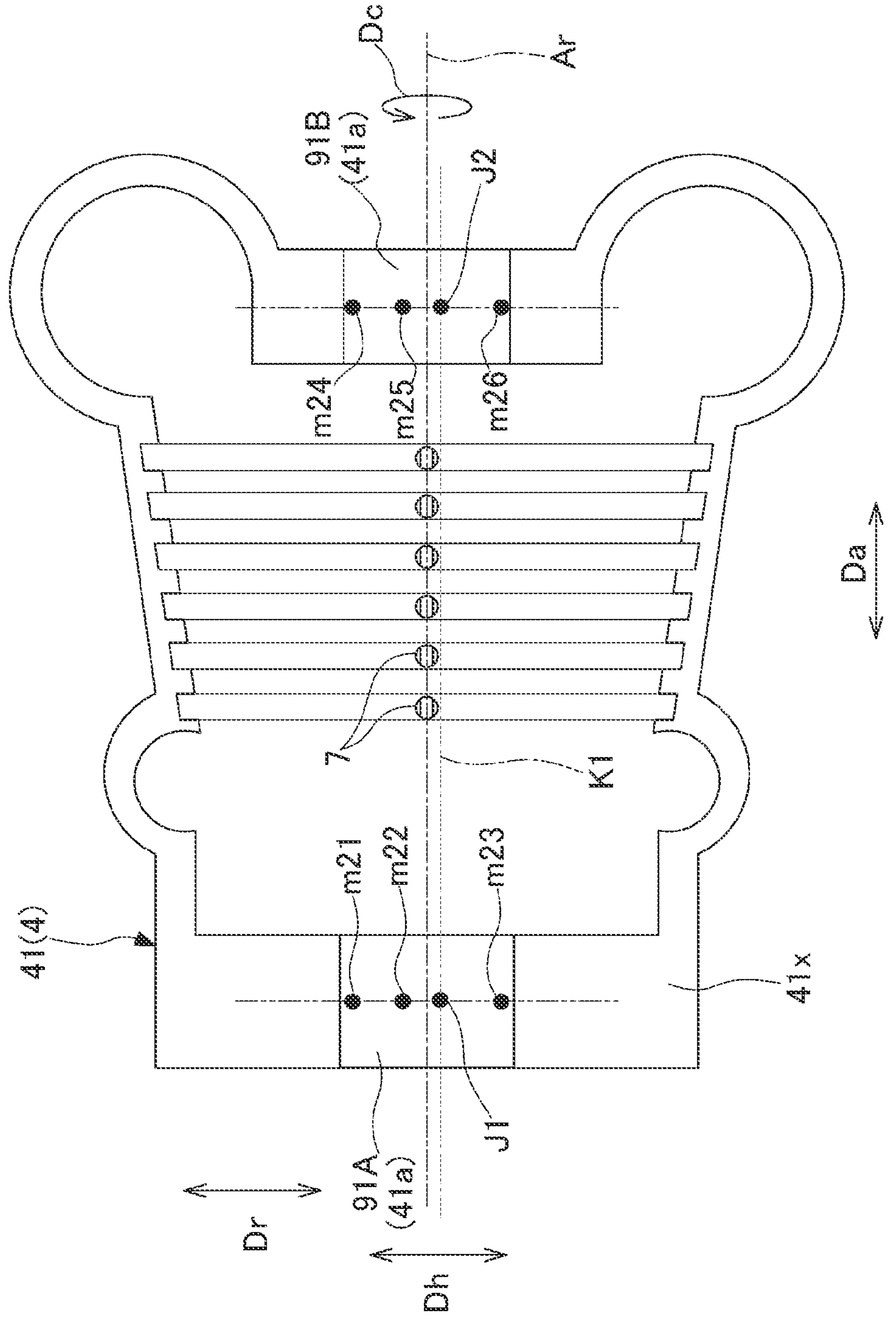
FIG. 8 is a plan view showing measurement points of three-dimensional measurement in a step of setting a virtual center axis of a casing.
Figure 9:
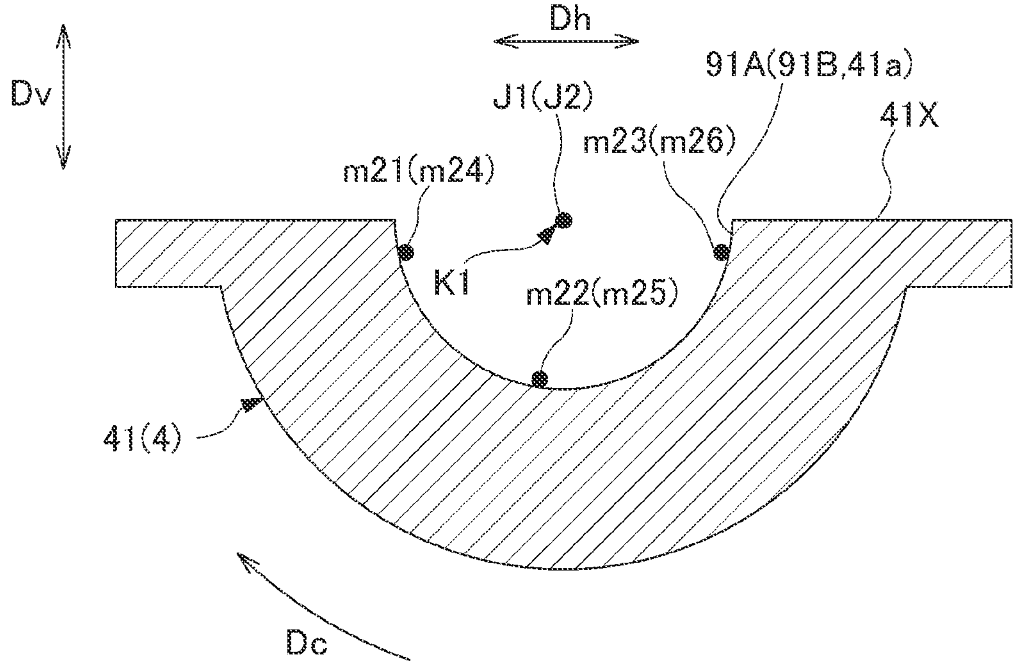
FIG. 9 is a view of the measurement points of three-dimensional measurement in the step of setting the virtual center axis of the casing as viewed from an axial direction.

In the step S120 of setting the virtual center axis of the casing, as shown in FIGS. 8 and 9, the inner peripheral surface 41*a* of the upper half casing 41 is measured by three-dimensional measurement at a plurality of measurement positions spaced apart from each other in the axial direction Da. As shown in FIG. 3, the inner peripheral surface 41*a* of the upper half casing 41 faces the outer peripheral surface 31*a* of the upper half diaphragm 31 when the upper half diaphragm 31 is fitted into the upper half casing 421. As shown in FIGS. 8 and 9, in the present embodiment, three-dimensional measurement is performed at each of two locations of the seal fixing surface 91A and the seal fixing surface 91B, which are spaced apart from each other in the axial direction Da, as the inner peripheral surface 41*a* of the upper half casing 41. On the seal fixing surface 91A, the measurement is performed at three or more measurement points m21 to m23 spaced apart from each other in the circumferential direction Dc, whereby the center of the virtual circle passing through the measurement points m21 to m23 is acquired. The center of the virtual circle passing through the measurement points m21 to m23 is acquired as a center point J1 on the seal fixing surface 91A which is one of the center points of the upper half casing 41 when viewed from the axial direction Da. In addition, on the seal fixing surface 91B, the measurement is performed at three or more measurement points m24 to m26 spaced apart from each other in the circumferential direction Dc, whereby the center of the virtual circle passing through the measurement points m24 to m26 is acquired. The center of the virtual circle passing through the measurement points m24 to m26 is acquired as a center point J2 on the seal fixing surface 91B which is one of the center points of the upper half casing 41 when viewed from the axial direction Da. Here, it is preferable that the three measurement points m21 and m23 have substantially the same position in the axial direction Da on the inner peripheral surface 41*a* of the upper half casing 41. That is, the three measurement points m21 to m23 are located on the same virtual plane orthogonal to the axis Ar. Similarly, it is preferable that the three measurement points m24 and m26 have substantially the same position in the axial direction Da on the inner peripheral surface 41*a* of the upper half casing 41. Based on a plurality of the acquired center points J1 and J2, a virtual center axis K1 of the upper half casing 41 is set. Specifically, a virtual line passing through the center points J1 and J2 is defined as the virtual center axis K1 of the upper half casing 41.

Here, although the position measurement is performed at the measurement points m21 to m26, the positions of the center points J1 and J2 may be acquired with higher accuracy by further increasing the number of the measurement points. When increasing the number of the measurement points, the number of the measurement points at locations (inner peripheral surface 41*a* of the upper half casing 41) at which the positions in the axial direction Da are the same may be increased to three or more. In addition, in order to increase the number of the center points, the number of the measurement locations (inner peripheral surface 41*a* of the upper half casing 41) having different positions in the axial direction Da may be increased to three or more. In addition, when the number of the center points is three or more, the virtual center axis K1 is defined as a virtual line passing through all the center points.

In the step S130 of acquiring the center position of the center guide pin, an outer shape of the center guide pin 7 is measured by three-dimensional measurement. Three-dimensional measurement is performed separately for a plurality of the center guide pins 7 disposed corresponding to each of a plurality of the upper half diaphragms 31. Specifically, as shown in FIG. 4, the positions of the pair of positioning surfaces 74 of the positioning portion 72 are measured. In the present embodiment, the positions of measurement points m31 and m32 of the pair of positioning surfaces 74 are measured at the intermediate position of the positioning portion 72 in the axial direction Da. From the measured positions of the measurement points m31 and m32, the intermediate position between the measurement points m31 and m32 in the horizontal direction Dh is calculated. By calculating the intermediate position between the measurement points m31 and m32 in the horizontal direction Dh, the intermediate position is acquired as the center position G1 of the center guide pin 7 in the horizontal direction Dh.

In the present embodiment, although the position measurement is performed at the measurement points m31 and m32 at the intermediate position of the positioning portion 72 in the axial direction Da, the center position G1 may be set with higher accuracy by performing the position measurement at a plurality of measurement points separated in the axial direction Da.

Figure 10:
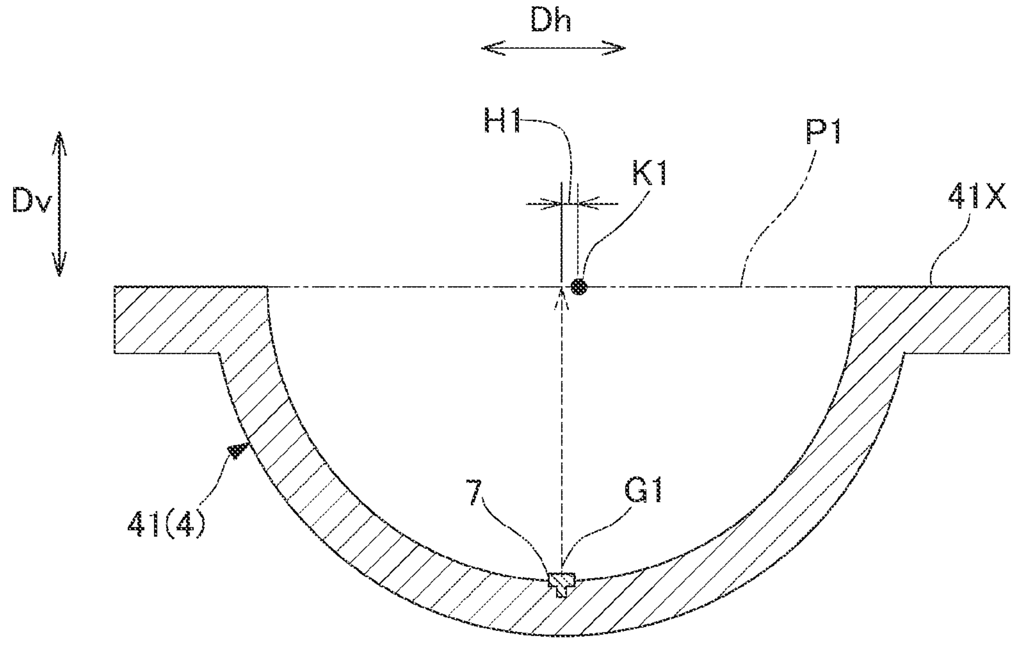
FIG. 10 is a view of a state where the virtual center axis of the casing and a center position of the center guide pin are projected on the casing reference plane in a step of acquiring a first offset amount, as viewed from the axial direction.

In the step S140 of acquiring the first offset amount, as shown in FIG. 10, the offset amount of the center position G1 of the center guide pin 7 from the virtual center axis K1 of the upper half casing 41 in the horizontal direction Dh is acquired as a first offset amount H1. Specifically, in the step S140 of acquiring the first offset amount, the virtual center axis K1 of the upper half casing 41 and the center position G1 of the center guide pin 7 are projected on the casing reference plane P1. Then, the deviation amount between the virtual center axis K1 of the upper half casing 41 and the center position G1 of the center guide pin 7 in the horizontal direction Dh on the casing reference plane P1 is acquired. This deviation amount is acquired as the first offset amount H1.

Figure 11:
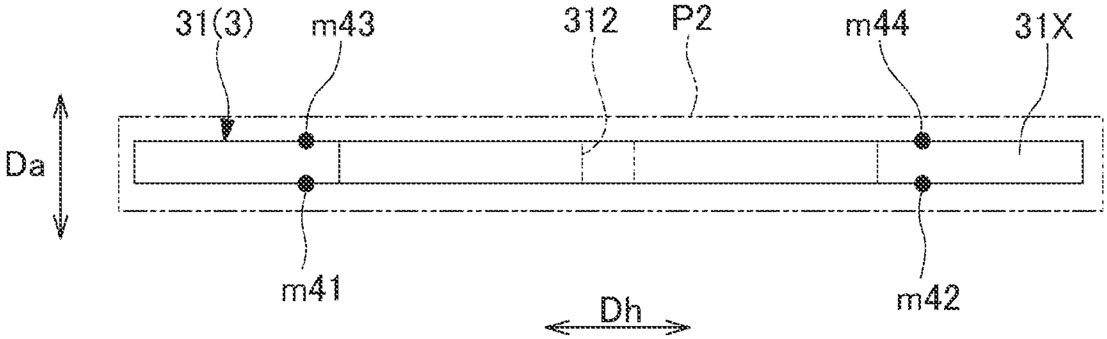
FIG. 11 is a view of measurement points of three-dimensional measurement in a step of setting a diaphragm reference plane as viewed from a diaphragm reference plane side.
Figure 12:
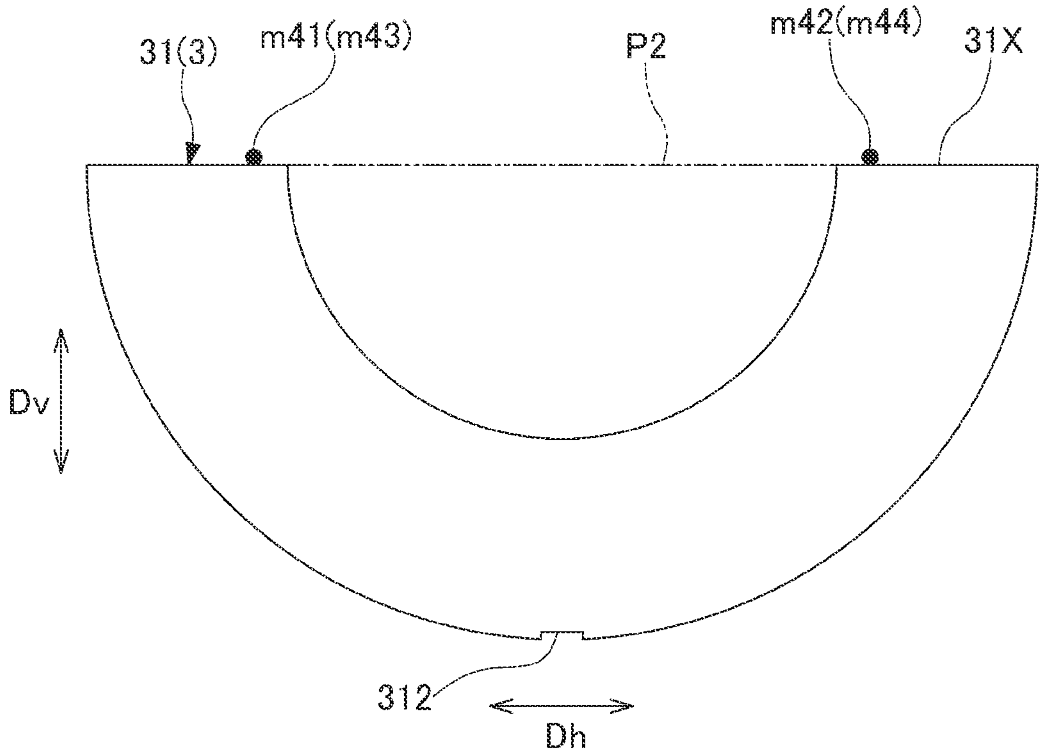
FIG. 12 is a view of the measurement points of three-dimensional measurement in the step of setting the diaphragm reference plane as viewed from the axial direction.

In the step S150 of setting the diaphragm reference plane, the diaphragm dividing surface 31X of the upper half diaphragm 31 is measured by three-dimensional measurement. For each of the plurality of upper half diaphragms 31, three-dimensional measurement of the diaphragm dividing surface 31X is performed separately. Specifically, as shown in FIGS. 11 and 12, the positions of three or more measurement points are measured by three-dimensional measurement at a plurality of locations separated in the axial direction Da and the horizontal direction Dh on the diaphragm dividing surface 31X. In the present embodiment, position measurement is performed at four measurement points m41 to m44 on the diaphragm dividing surface 31X. The measurement points m41 and m42 are two points at which the positions in the axial direction Da are substantially the same and which are separated in the horizontal direction Dh. The measurement points m43 and m44 are two points separated from the measurement points m41 and m42 in the axial direction Da and separated from each other in the horizontal direction Dh. It is preferable that the measurement points m43 and m44 are located as far apart as possible in the axial direction Da from the measurement points m41 and m42. The measurement points m43 and m44 have substantially the same position in the axial direction Da.

Based on the four measured measurement points m41 to m44, the diaphragm reference plane P2 which is a virtual plane on the diaphragm dividing surface 31X is set as a virtual plane including the measurement points m41 to m44. That is, the diaphragm reference plane P2 parallel to the diaphragm dividing surface 31X is set.

Here, although one measurement is performed at the measurement points m41 to m44, the diaphragm reference plane P2 may be set with higher accuracy by further increasing the number of the measurement points. When increasing the number of the measurement points, the number of the measurement locations (diaphragm dividing surface 31X of one upper half diaphragm 31) having different positions in the axial direction Da may be increased to three or more, and the number of the measurement points at locations at which the positions in the axial direction Da are the same may be increased to three or more. In addition, although the four measurement points m41 to m44 are measured, the diaphragm reference plane P2 may be set by measuring three points.

Figure 13:
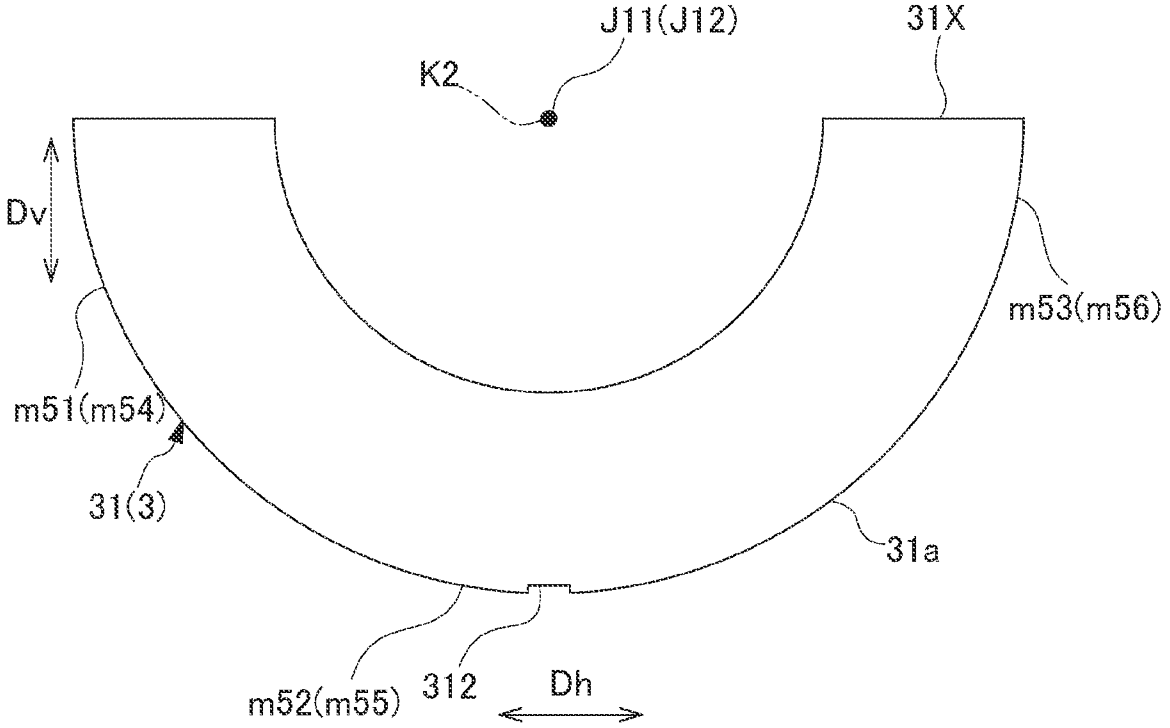
FIG. 13 is a view of measurement points of three-dimensional measurement in a step of setting a virtual center axis of the diaphragm as viewed from the axial direction.
Figure 14:
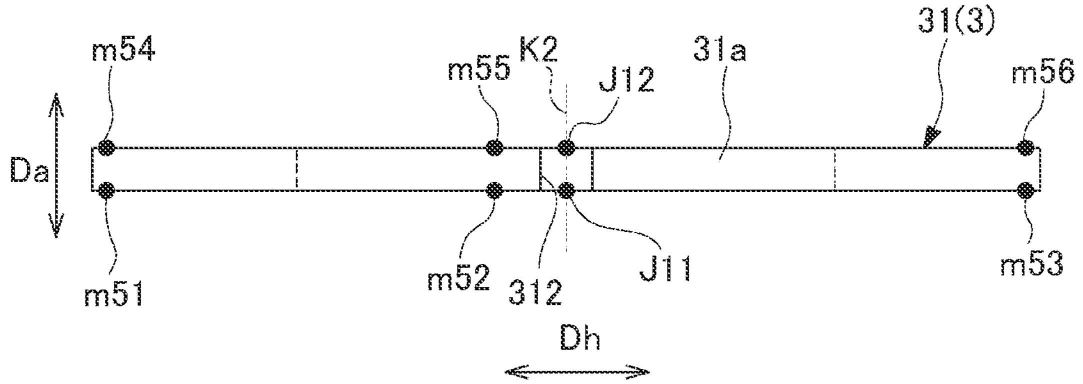
FIG. 14 is a view of the measurement points of three-dimensional measurement in the step of setting the virtual center axis of the diaphragm as viewed from an outside in a radial direction of the diaphragm.

In the step S160 of setting the virtual center axis of the diaphragm, as shown in FIGS. 13 and 14, the outer peripheral surface 31*a* of each upper half diaphragm 31 is measured by three-dimensional measurement. For each of the plurality of upper half diaphragms 31, three-dimensional measurement of the outer peripheral surface 31*a* of the upper half diaphragm 31 is performed separately. Specifically, the outer peripheral surface 31*a* of one upper half diaphragm 31 is measured by three-dimensional measurement at a plurality of measurement positions different in the axial direction Da (a plurality of measurement positions spaced apart from each other in the axial direction Da). In the present embodiment, first, three or more measurement points m51 to m53 having the same position in the axial direction Da and spaced apart from each other in the circumferential direction Dc are measured, whereby the center of the virtual circle passing through the measurement points m51 to m53 is acquired. The center of the virtual circle passing through the measurement points m51 to m53 is acquired as a center point J11 of the upper half diaphragm 31 when viewed from the axial direction Da. After that, at positions separated from the measurement points m51 to m53 in the axial direction Da, three or more measurement points m54 to m56 having the same position in the axial direction Da and spaced apart in the circumferential direction Dc are measured. As a result, the center of the virtual circle passing through the measurement points m54 to m56 is acquired. The center of the virtual circle passing through the measurement points m54 to m56 is acquired as a center point J12 of the upper half diaphragm 31 when viewed from the axial direction Da. Based on a plurality of the acquired center points J11 and J12, a virtual center axis K2 of the upper half diaphragm 31 is set. Specifically, a virtual line passing through all of the center points J11 and J12 is defined as the virtual center axis K2 of the upper half diaphragm 31. In a case where it is determined that the offset of the outer peripheral surface 31*a* of the upper half diaphragm 31 and the inner peripheral surface of the upper half diaphragm 31 is small, measurement may be performed not on the outer peripheral surface 31*a* of the upper half diaphragm 31 but on the inner peripheral surface of the upper half diaphragm 31.

Figure 15:
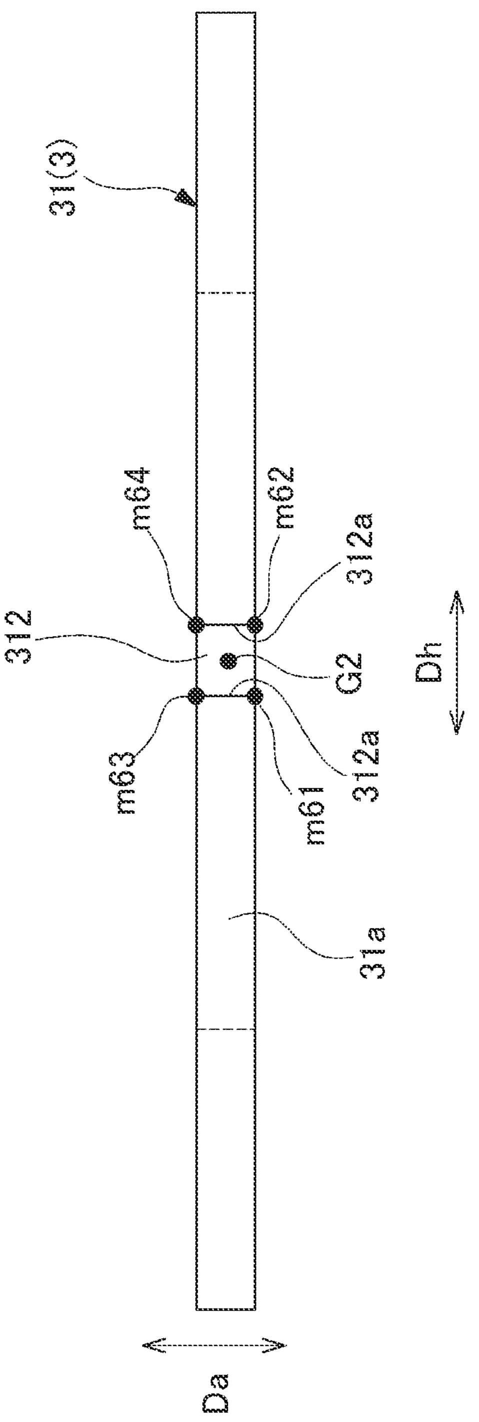
FIG. 15 is a view of measurement points of three-dimensional measurement in a step of acquiring a center position of a groove portion as viewed from the outside in the radial direction of the diaphragm.

In the step S170 of acquiring the center position of the groove portion, the shape of the groove portion 312 is measured by three-dimensional measurement. For each of the plurality of upper half diaphragms 31, three-dimensional measurement of the shape of the groove portion 312 is performed separately. Specifically, as shown in FIG. 15, the positions of a pair of the two inner side surfaces 312*a* of the groove portion 312 are measured. In the present embodiment, the positions of measurement points m61 and m62 of the two inner side surfaces 312*a* are measured at the intermediate position of the groove portion 312 in the axial direction Da. From the measured positions of the measurement points m61 and m62, the intermediate position between the measurement points m61 and m62 in the horizontal direction Dh is calculated. By calculating the intermediate position between the measurement points m61 and m62 in the horizontal direction Dh, the intermediate position is acquired as the center position G2 of the groove portion 312 in the horizontal direction Dh.

Here, although the position measurement is performed at the measurement points m61 and m62 at the intermediate position of the groove portion 312 in the axial direction Da, the center position G2 may be set with higher accuracy by performing the position measurement at a plurality of measurement points separated in the axial direction Da.

Figure 16:
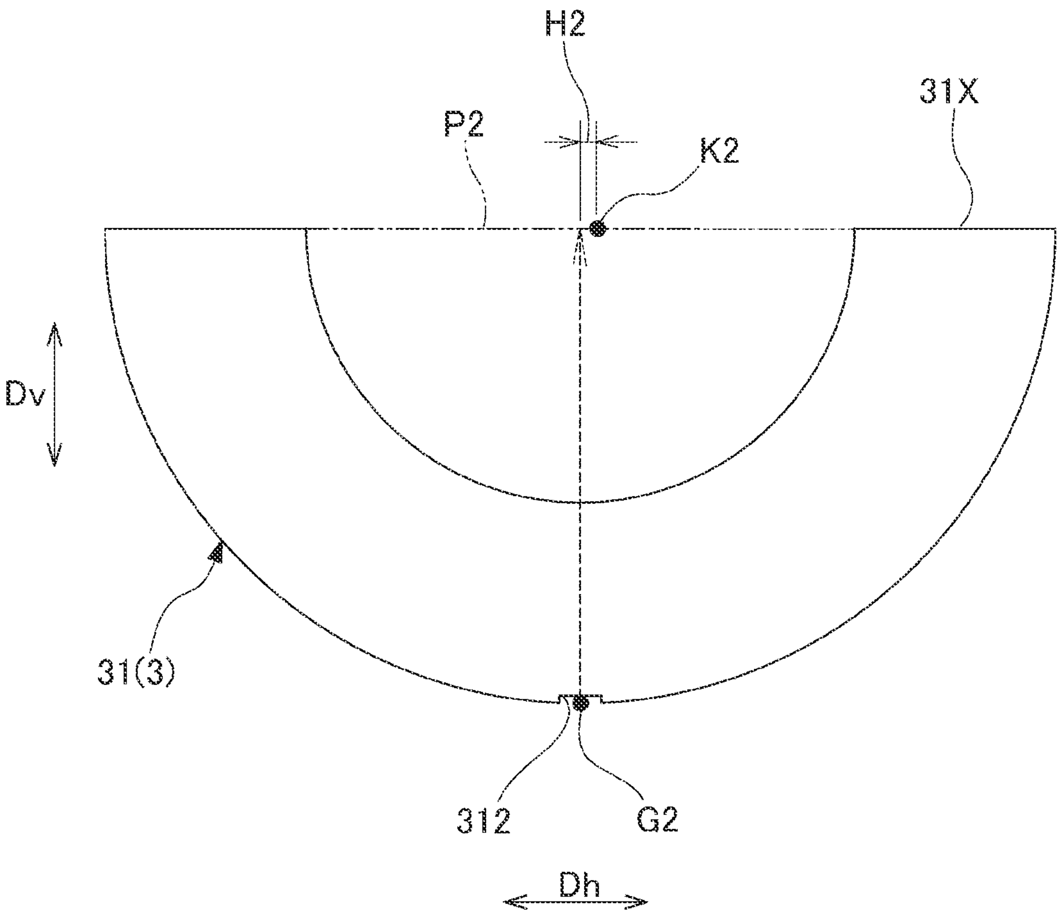
FIG. 16 is a view of a state where the virtual center axis of the diaphragm and the center position of the groove portion are projected on the diaphragm reference plane in a step of acquiring a second offset amount, as viewed from the axial direction.

In the step S180 of acquiring the second offset amount, as shown in FIG. 16, the offset amount of the center position G2 of the groove portion 312 from the virtual center axis K2 of the upper half diaphragm 31 in the horizontal direction Dh is acquired as a second offset amount H2. Specifically, in the step S180 of acquiring the second offset amount, the virtual center axis K2 of the upper half diaphragm 31 and the center position G2 of the groove portion 312 are projected on the diaphragm reference plane P2. Then, the deviation amount between the virtual center axis K2 of the upper half diaphragm 31 and the center position G2 of the groove portion 312 in the horizontal direction Dh on the diaphragm reference plane P2 is acquired. This deviation amount is acquired as the second offset amount H2.

In the step S190 of designing the center guide pin, based on the acquired first offset amount H1 and second offset amount H2, the center guide pin 7 is designed such that the position of the upper half diaphragm 31 in the horizontal direction Dh in a state where the upper half diaphragm 31 is incorporated in the upper half casing 41 is within a tolerance determined with respect to the upper half casing 41. In this case, when the position of the upper half diaphragm 31 in the horizontal direction Dh in a state where the upper half diaphragm 31 is incorporated in the upper half casing 41 is within the tolerance determined with respect to the upper half casing 41, there is no need to newly design the center guide pin 7, and the center guide pin 7 mounted on the upper half casing 41 at that time can be used as it is. In a case where the position of the upper half diaphragm 31 in the horizontal direction Dh in a state where the upper half diaphragm 31 is incorporated in the upper half casing 41 is outside the tolerance determined with respect to the upper half casing 41, the amount of offsetting the center position G1 of the pair of positioning surfaces 74 of the center guide pin 7 in the horizontal direction Dh from the pin axis O1 in the horizontal direction Dh is determined. Specifically, the amount of change in the shape of the positioning portion 72 is determined by cutting or build-up welding one of the pair of positioning surfaces 74. The center guide pin 7 may be newly manufactured.

(Manufacturing Method of Center Guide Pin)

Figure 17:
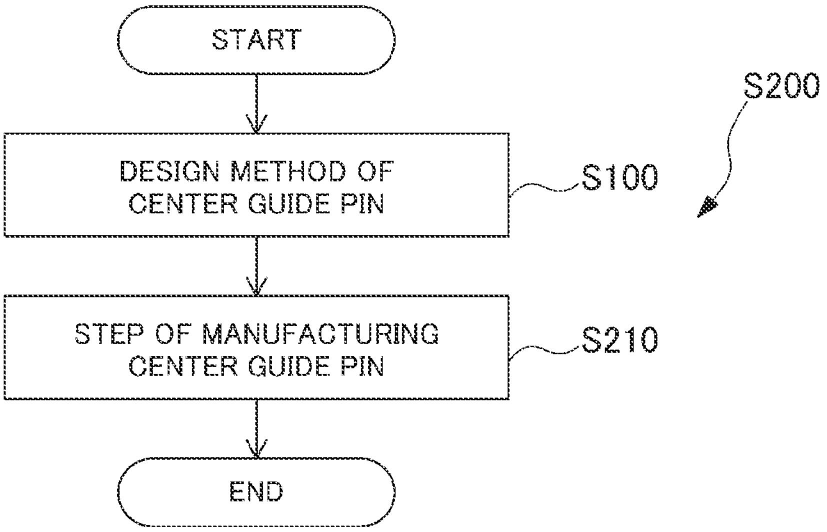
FIG. 17 is a flowchart showing a procedure of the manufacturing method of a center guide pin according to the embodiment of the present disclosure.

As shown in FIG. 17, the manufacturing method S200 of the center guide pin includes the design method S100 of the center guide pin and a step S210 of manufacturing the center guide pin designed by the design method S100 of the center guide pin. That is, in the step S190 of designing the center guide pin, the center guide pin 7 in which the center position G1 of the pair of positioning surfaces 74 in the horizontal direction Dh is offset is manufactured by a processing machine (not shown) such that the position of the diaphragm 3 in the horizontal direction Dh is within the tolerance determined with respect to the upper half casing 41.

Here, for example, when the steam turbine 1 is newly installed, a new center guide pin 7 is manufactured in which the center position G1 of the pair of positioning surfaces 74 in the horizontal direction Dh coincides with the pin axis O1. In addition, during maintenance of the existing steam turbine 1, the center guide pin 7 mounted on the upper half casing 41 at that time is remodeled, and one of the pair of positioning surfaces 74 is cut or build-up welded. As a result, the center guide pin 7 modified such that the shape of the positioning portion 72 fits within the tolerance is manufactured.

(Assembling Method of Steam Turbine)

Figure 18:
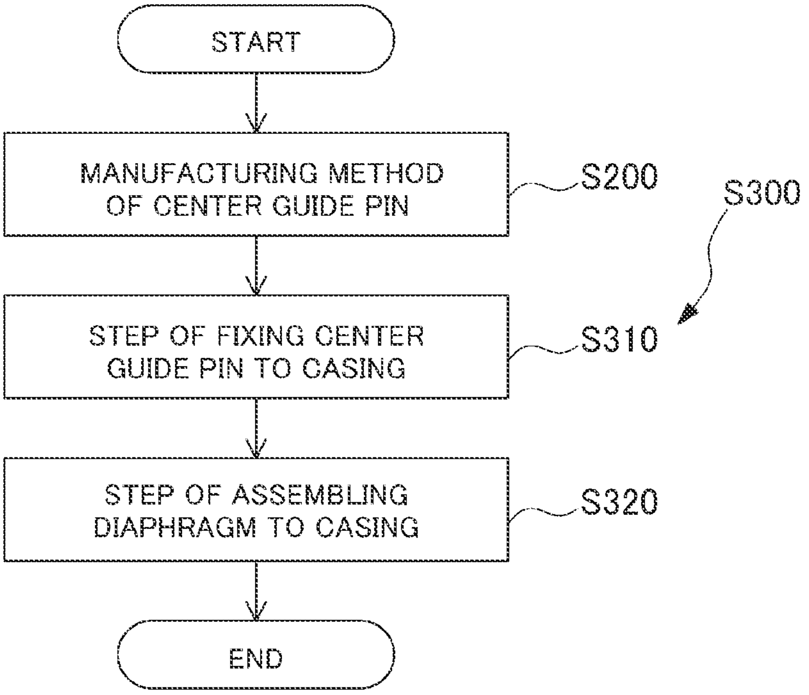
FIG. 18 is a flowchart showing a procedure of the assembling method of a rotary machine according to the embodiment of the present disclosure.

In order to assemble the steam turbine 1, an assembling method S300 of the rotary machine is executed as follows. The assembling method S300 of the rotary machine is performed when the steam turbine 1 is newly installed or when the existing steam turbine 1 is disassembled for maintenance or the like and then reassembled. As shown in FIG. 18, the assembling method S300 of the rotary machine of the present embodiment includes the manufacturing method S200 of the center guide pin, a step S310 of fixing the center guide pin to the casing, and a step S320 of assembling the diaphragm to the casing.

In the step S310 of fixing the center guide pin to the casing, the center guide pin 7 manufactured by the above-described manufacturing method S200 of the center guide pin is fixed to the inner peripheral surface 41*a* of the upper half casing 41. For this purpose, the pin base portion 71 of the center guide pin 7 is housed in the recess portion 412*a* of the pin mounting portion 412, and the fastening member 73 is fastened. As a result, the center guide pin 7 is fixed to the upper half casing 41. Similarly, the center guide pin 7 is fixed to the inner peripheral surface 41*a* of the lower half casing 42.

In the step S320 of assembling the diaphragm to the casing, the upper half diaphragm 31 in which the groove portion 312 is formed is assembled to the upper half casing 41 by using a lifting machine, such as a crane. The upper half diaphragm 31 is placed on the upper half casing 41 such that the positioning portion 72 is fitted into the groove portion 312. By fitting the positioning portion 72 into the groove portion 312, the incorporation position of the upper half diaphragm 31 in the horizontal direction Dh with respect to the upper half casing 41 is appropriately adjusted. Similarly, the lower half diaphragm 32 in which the groove portion 312 is formed is assembled to the lower half casing 42 by using a lifting machine, such as a crane. After that, the steam turbine 1 is assembled by assembling the upper half diaphragm 31 and the upper half casing 41, and assembling the lower half diaphragm 32 and the lower half casing 42.

(Action Effect)

In the design method S100 of the center guide pin having the above configuration, the center guide pin 7 can be designed by measuring main parts of the casing 4 and the diaphragm 3 without temporarily assembling the diaphragm 3 to the casing 4. Specifically, the virtual center axis K1 of the upper half casing 41 and the center position G1 of the center guide pin 7 are acquired by three-dimensional measurement. By acquiring the first offset amount H1 based on these, the deviation amount of the center guide pin 7 as a positioning member with respect to the upper half casing 41 can be acquired in an independent state without assembling the center guide pin 7 and the upper half casing 41. Further, the virtual center axis K2 of the upper half diaphragm 31 and the center position G2 of the groove portion 312 are acquired by three-dimensional measurement. By acquiring the second offset amount H2 based on these, the deviation amount of the position and shape where the groove portion 312 is formed with respect to the upper half diaphragm 31 can be acquired while the upper half diaphragm 31 is independent. Then, the positioning portion 72 of the center guide pin 7 is designed based on the first offset amount H1 and the second offset amount H2. Therefore, it is possible to design the center guide pin 7 capable of disposing the upper half diaphragm 31 at an appropriate position when the upper half diaphragm 31 is incorporated in the upper half casing 41. As a result, the incorporation position of the upper half diaphragm 31 with respect to the upper half casing 41 in the horizontal direction Dh can be appropriately adjusted without adjusting the upper half diaphragm 31 by incorporating the upper half diaphragm 31 in the upper half casing 41 many times. Therefore, the diaphragm 3 can be easily aligned with the casing 4 to improve work efficiency.

The virtual center axis K1 of the upper half casing 41 and the center position G1 of the center guide pin 7 are projected on the casing reference plane P1 which is a virtual plane on the casing dividing surface 41X, to acquire the first offset amount H1. As a result, the influence of the deviation between the virtual center axis K1 and the center position G1 in the vertical direction Dv is suppressed, so that the first offset amount H1 on the virtual plane parallel to the casing dividing surface 41X can be acquired. Therefore, the first offset amount H1 can be acquired with higher accuracy.

The virtual center axis K2 of the upper half diaphragm 31 and the center position G2 of the groove portion 312 are projected on the diaphragm reference plane P2 which is a virtual plane on the diaphragm dividing surface 31X, to acquire the second offset amount H2. As a result, the influence of the deviation between the virtual center axis K2 and the center position G2 in the vertical direction Dv is suppressed, so that the second offset amount H2 on the virtual plane parallel to the diaphragm dividing surface 31X can be acquired. Therefore, the second offset amount H2 can be acquired with higher accuracy.

The outer shape of the positioning portion 72 is measured at the intermediate position of the positioning portion 72 of the center guide pin 7 in the axial direction Da. When the center guide pin 7 is mounted on the upper half casing 41 or the lower half casing 42, there is a case where the center guide pin 7 rotates about the pin axis O1 and is fixed to the upper half casing 41 or the lower half casing 42. As a result, the positioning portion 72 may be disposed such that the pair of positioning surfaces 74 are inclined with respect to the axis Ar. In a case where the positioning portion 72 is disposed so as to be inclined in this way, the deviation is generated on the position of the positioning surface 74 at both ends of the positioning portion 72 in the axial direction Da. However, by performing the measurement at the intermediate position of the positioning portion 72 in the axial direction Da, it is possible to suppress the influence of the deviation on the position of the positioning surface 74 due to the inclination of the positioning portion 72. As a result, the center position G1 of the center guide pin 7 can be acquired with high accuracy.

In addition, the virtual center axis K1 of the casing 4 is set by measuring the seal fixing surfaces 91A and 91B by three-dimensional measurement. The seal fixing surfaces 91A and 91B to which the seal members 90A and 90B that seal a space between the casing 4 and the outer peripheral surface of the rotor 2 are fixed are one of regions formed with the highest accuracy in the inner peripheral surface of the casing 4 in order to improve sealing performance. By measuring such seal fixing surfaces 91A and 91B, the virtual center axis K1 of the casing 4 can be set with high accuracy.

In addition, by measuring a plurality of the outer peripheral surfaces 31*a* of the diaphragm 3 at positions separated in the axial direction Da, the virtual center axis K2 of the diaphragm 3 can be set with high accuracy.

The shape of the groove portion 312 is measured at the intermediate position of the groove portion 312 in the axial direction Da. Therefore, even though the groove portion 312 is formed so as to be inclined with respect to the upper half diaphragm 31 and the lower half diaphragm 32, the influence of the inclination of the groove portion 312 can be suppressed. As a result, the center position G2 of the groove portion 312 can be acquired with high accuracy.

According to the manufacturing method S200 of the center guide pin having the above configuration, it is possible to efficiently manufacture the center guide pin 7 by which the diaphragm 3 can be easily aligned with the casing 4 without temporarily assembling the diaphragm 3 to the casing 4.

According to the assembling method S300 of the rotary machine having the above configuration, it is possible to efficiently manufacture the steam turbine 1 by using the center guide pin 7 by which the diaphragm 3 can be easily aligned with the casing 4 without temporarily assembling the diaphragm 3 to the casing 4.

Another Embodiment

While preferred embodiments have been described and illustrated above, it should be understood that these are exemplary o and are not to be considered as limiting. Additions, omissions, substitutions, and other modifications can be made without departing from the scope of the embodiment. Accordingly, the embodiment is not to be considered as being limited by the foregoing description and is only limited by the scope of the appended claims.

In the above embodiment, the measurement points measured by three-dimensional measurement are described as exemplary examples, but the positions and numbers of the measurement points can be changed as appropriate.

The procedures of the design method S100 of the center guide pin 7, the manufacturing method S200 of the center guide pin, and the assembling method S300 of the rotary machine, which are described in the above embodiment, can be changed as appropriate.

In the above embodiment, as the rotary machine, the steam turbine 1 is described as an exemplary example, but the rotary machine may be, for example, a compressor.

<Appendix>

The design method S100 of the center guide pin 7, the manufacturing method S200 of the center guide pin, and the assembling method S300 of the rotary machine according to the embodiment are grasped as follows, for example.

(1) A design method S100 of a center guide pin 7 according to a first aspect is a design method S100 of a center guide pin 7 of a rotary machine that includes a rotor 2, a casing 4, a diaphragm 3, a groove portion 312, and the center guide pin 7, the rotor 2 being rotatable about an axis Ar, the casing 4 extending in a circumferential direction of the rotor 2 and being vertically separable by a casing dividing surface 41X which is a horizontal plane Sh, the diaphragm 3 being disposed between the casing 4 and the rotor 2, extending in the circumferential direction of the rotor 2, and being vertically separable by a diaphragm dividing surface 31X which is the horizontal plane Sh, the groove portion 312 being formed on an outer peripheral surface 31*a* of the diaphragm 3 so as to extend in an axial direction Da in which the axis Ar extends, and the center guide pin 7 being capable of positioning the diaphragm 3 with respect to the casing 4 in a horizontal direction Dh orthogonal to the axial direction Da by being fixed to an inner peripheral surface 41*a* of the casing 4 facing the outer peripheral surface 31*a* of the diaphragm 3 and fitted into the groove portion 312, the design method including: a step S120 of acquiring a plurality of center points of the casing 4 when viewed from the axial direction Da by measuring the inner peripheral surface 41*a* of the casing 4 by three-dimensional measurement at a plurality of measurement positions spaced apart from each other in the axial direction Da, and setting a virtual center axis K1 of the casing 4 based on the plurality of center points of the casing 4; a step S130 of acquiring a center position G1 of the center guide pin 7 in the horizontal direction Dh by measuring an outer shape of the center guide pin 7 by three-dimensional measurement; a step S140 of acquiring, as a first offset amount H1, an offset amount of the center position G1 of the center guide pin 7 from the virtual center axis K1 of the casing 4 in the horizontal direction Dh; a step S160 of acquiring a center point of the diaphragm 3 when viewed from the axial direction Da by measuring the outer peripheral surface 31*a* of the diaphragm 3 by three-dimensional measurement, and setting a virtual center axis K2 of the diaphragm 3 based on the center point of the diaphragm 3; a step S170 of acquiring a center position G2 of the groove portion 312 in the horizontal direction Dh by measuring the shape of the groove portion 312 by three-dimensional measurement; a step S180 of acquiring, as a second offset amount H2, an offset amount of the center position G2 of the groove portion 312 from the virtual center axis K2 of the diaphragm 3 in the horizontal direction Dh; and a step S190 of designing the center guide pin 7 based on the first offset amount H1 and the second offset amount H2 such that a position of the diaphragm 3 in the horizontal direction Dh in a state where the diaphragm 3 is incorporated in the casing 4 is within a tolerance determined with respect to the casing 4. As the rotary machine, a steam turbine and a compressor are exemplary examples.

In the design method S100 of the center guide pin 7, the center guide pin 7 can be designed by measuring main parts of the casing 4 and the diaphragm 3 without temporarily assembling the diaphragm 3 to the casing 4. Specifically, the virtual center axis K1 of the casing and the center position G1 of the center guide pin 7 are acquired by three-dimensional measurement. By acquiring the first offset amount H1 based on these, the deviation amount of the center guide pin 7 as a positioning member with respect to the casing can be acquired in an independent state without assembling the center guide pin 7 and the casing. Further, the virtual center axis K2 of the diaphragm and the center position G2 of the groove portion 312 are acquired by three-dimensional measurement. By acquiring the second offset amount H2 based on these, the deviation amount of the position and shape where the groove portion 31 is formed with respect to the diaphragm can be acquired while the diaphragm is independent. Then, the center guide pin 7 is designed based on the first offset amount H1 and the second offset amount H2. Therefore, it is possible to design the center guide pin 7 capable of disposing the diaphragm at an appropriate position when the diaphragm is incorporated in the casing. As a result, the incorporation position of the diaphragm with respect to the casing in the horizontal direction Dh can be appropriately adjusted without adjusting the diaphragm by incorporating the diaphragm in the casing many times. Therefore, the diaphragm 3 can be easily aligned with the casing 4 to improve work efficiency.

(2) A design method S100 of a center guide pin 7 according to a second aspect is the design method S100 of the center guide pin 7 according to (1), further including: a step S110 of setting a casing reference plane P1, which is a virtual plane on the casing dividing surface 41X, by measuring the casing dividing surface 41X by three-dimensional measurement, in which, in the step S140 of acquiring the first offset amount H1, the virtual center axis K1 of the casing 4 and the center position G1 of the center guide pin 7 are projected on the casing reference plane P1 to acquire the first offset amount H1.

As a result, the influence of the deviation between the virtual center axis K1 and the center position G1 in the vertical direction Dv is suppressed, so that the first offset amount H1 on the virtual plane parallel to the casing dividing surface 41X can be acquired. Therefore, the first offset amount H1 can be acquired with higher accuracy.

(3) A design method S100 of a center guide pin 7 according to a third aspect is the design method S100 of the center guide pin 7 according to (1) or (2), further including: a step S150 of setting a diaphragm reference plane P2, which is a virtual plane on the diaphragm dividing surface 31X, by measuring the diaphragm dividing surface 31X by three-dimensional measurement, in which, in the step S180 of acquiring the second offset amount H2, the virtual center axis K2 of the diaphragm 3 and the center position G2 of the groove portion 312 are projected on the diaphragm reference plane P2 to acquire the second offset amount H2.

As a result, the influence of the deviation between the virtual center axis K2 and the center position G2 in the vertical direction Dv is suppressed, so that the second offset amount H2 on the virtual plane parallel to the diaphragm dividing surface 31X can be acquired. Therefore, the second offset amount H2 can be acquired with higher accuracy.

(4) A design method S100 of a center guide pin 7 according to a fourth aspect is the design method S100 of the center guide pin 7 according to any one of (1) to (3), in which the center guide pin 7 includes a positioning portion 72 that is disposed inside the groove portion 312 in a state of being fixed to the casing 4, and in the step S130 of acquiring the center position G1 of the center guide pin 7, an outer shape of the positioning portion 72 is measured at an intermediate position of the positioning portion 72 in the axial direction Da.

As a result, by performing the measurement at the intermediate position of the positioning portion 72 in the axial direction Da, it is possible to suppress the influence of the deviation on the position of the positioning surface 74 due to the inclination of the positioning portion 72. As a result, the center position G1 of the center guide pin 7 can be acquired with high accuracy.

(5) A design method S100 of a center guide pin 7 according to a fifth aspect is the design method S100 of the center guide pin 7 according to any one of (1) to (4), in which the casing 4 has a plurality of seal fixing surfaces 91A and 91B to which seal members 90A and 90B sealing a space between the casing 4 and the outer peripheral surface of the rotor 2 and formed in an annular shape are fixed, and in the step S120 of setting the virtual center axis K1 of the casing 4, the plurality of center points J1 and J2 of the casing 4 are acquired by measuring the plurality of seal fixing surfaces 91A and 91B by three-dimensional measurement.

In this way, the seal fixing surfaces 91A and 91B to which the seal members 90A and 90B that seal a space between the casing 4 and the outer peripheral surface of the rotor 2 are fixed are one of regions formed with the highest accuracy in the inner peripheral surface of the casing 4 in order to improve sealing performance. By measuring such seal fixing surfaces 91A and 91B, the virtual center axis K1 of the casing 4 can be set with high accuracy.

(6) A design method S100 of a center guide pin 7 according to a sixth aspect is the design method S100 of the center guide pin 7 according to any one of (1) to (5), in which, in the step S160 of setting the virtual center axis K2 of the diaphragm 3, a plurality of the outer peripheral surfaces 31*a* of the diaphragm 3 are measured at positions separated in the axial direction Da.

As a result, by measuring a plurality of the outer peripheral surfaces 31*a* of the diaphragm 3 at positions separated in the axial direction Da, the virtual center axis K2 of the diaphragm 3 can be set with high accuracy.

(7) A design method S100 of a center guide pin 7 according to a seventh aspect is the design method S100 of the center guide pin 7 according to any one of (1) to (6), in which, in the step S170 of acquiring the center position G2 of the groove portion 312, the shape of the groove portion 312 is measured at an intermediate position of the groove portion 312 in the axial direction Da.

As a result, even though the groove portion 312 is formed so as to be inclined with respect to the diaphragm, the influence of the inclination of the groove portion 312 can be suppressed. As a result, the center position G2 of the groove portion 312 can be acquired with high accuracy.

(8) A manufacturing method S200 of a center guide pin according to an eighth aspect, includes: a step S210 of manufacturing the center guide pin 7 designed by the design method S100 of the center guide pin 7 according to any one of (1) to (7).

As a result, it is possible to efficiently manufacture the center guide pin 7 by which the diaphragm 3 can be easily aligned with the casing 4 without temporarily assembling the diaphragm 3 to the casing 4.

(9) An assembling method S300 of a rotary machine according to a ninth aspect includes: a step S310 of fixing the center guide pin 7 manufactured by the manufacturing method S200 of a center guide pin according to (8) to the inner peripheral surface 41*a* of the casing 4; and a step S320 of assembling the diaphragm 3 on which the groove portion 312 is formed to the casing 4 and fitting the center guide pin 7 into the groove portion 312.

As a result, it is possible to efficiently manufacture the steam turbine 1 by using the center guide pin 7 by which the diaphragm 3 can be easily aligned with the casing 4 without temporarily assembling the diaphragm 3 to the casing 4.

EXPLANATION OF REFERENCES

1 . . . Steam turbine (rotary machine)
2 . . . Rotor
3 . . . Diaphragm
4 . . . Casing
5 . . . Vertical position defining portion
7 . . . Center guide pin
21 . . . Rotor shaft
22 . . . Turbine blades
30 . . . Turbine stationary blades
31 . . . Upper half diaphragm (diaphragm)
31X, 32X . . . Diaphragm dividing surface
31*a* . . . Outer peripheral surface

31*b* . . . Insertion recess portion
32 . . . Lower half diaphragm (diaphragm)
41 . . . Upper half casing (casing)
41X, 42X . . . Casing dividing surface
41*a* . . . Inner peripheral surface
41*b* . . . Mounting recess portion
42 . . . Lower half casing (casing)
51 . . . Upper half diaphragm support
52 . . . Bolt
71 . . . Pin base portion
72 . . . Positioning portion
72*f* . . . Positioning surface
73 . . . Fastening member
73*a* . . . Male screw portion
90A, 90B . . . Seal member
91A, 91B . . . Seal fixing surface
312 . . . Groove portion
312*a* . . . Inner side surface
312*b* . . . Bottom surface
412 . . . Pin mounting portion
412*a*: Recess portion
412*b* . . . Female screw portion
412*c* . . . Hole
Ar . . . Axis
Da . . . Axial direction
Dc . . . Circumferential direction
Dh . . . Horizontal direction
Dr . . . Radial direction
Dv . . . Vertical direction
F . . . Flange portion
G1, G2 . . . Center position
H1 . . . First offset amount
H2 . . . Second offset amount
J1, J2, J11, J12 . . . Center point
K1, K2 . . . Virtual center axis
O1 . . . Pin axis
P1 . . . Casing reference plane
P2 . . . Diaphragm reference plane
Sh . . . Horizontal plane
Sv . . . Vertical line
S100 . . . Design method of center guide pin
S110 . . . Step of setting casing reference plane
S120 . . . Step of setting virtual center axis of casing
S130 . . . Step of acquiring center position of center guide pin
S140 . . . Step of acquiring first offset amount
S150 . . . Step of setting diaphragm reference plane
S160 . . . Step of setting virtual center axis of diaphragm
S170 . . . Step of acquiring center position of groove portion
S180 . . . Step of acquiring second offset amount
S190 . . . Step of designing center guide pin
S200 . . . Manufacturing method of center guide pin
S210 . . . Step of manufacturing center guide pin
S300 . . . Assembling method of rotary machine
S310 . . . Step of fixing center guide pin to casing
S320 . . . Step of assembling diaphragm to casing

What is claimed is:

1. A design method of a center guide pin of a rotary machine that includes a rotor, a casing, a diaphragm, a groove portion, and the center guide pin, the rotor being rotatable about an axis, the casing extending in a circumferential direction of the rotor and being vertically separable by a casing dividing surface which is a horizontal plane, the diaphragm being disposed between the casing and the rotor, extending in the circumferential direction of the rotor, and being vertically separable by a diaphragm dividing surface which is a horizontal plane, the groove portion being formed on an outer peripheral surface of the diaphragm so as to extend in an axial direction in which the axis extends, and the center guide pin being fixed to an inner peripheral surface of the casing facing the outer peripheral surface of the diaphragm and capable of positioning the diaphragm with respect to the casing in a horizontal direction orthogonal to the axial direction by being fitted into the groove portion, the design method comprising:

a step of acquiring a plurality of center points of the casing when viewed from the axial direction by measuring the inner peripheral surface of the casing by three-dimensional measurement at a plurality of measurement positions spaced apart from each other in the axial direction, and setting a virtual center axis of the casing based on the plurality of center points of the casing;

a step of acquiring a center position of the center guide pin in the horizontal direction by measuring an outer shape of the center guide pin by three-dimensional measurement;

a step of acquiring, as a first offset amount, an offset amount of the center position of the center guide pin from the virtual center axis of the casing in the horizontal direction;

a step of acquiring a center point of the diaphragm when viewed from the axial direction by measuring the outer peripheral surface of the diaphragm by three-dimensional measurement, and setting a virtual center axis of the diaphragm based on the center point of the diaphragm;

a step of acquiring a center position of the groove portion in the horizontal direction by measuring a shape of the groove portion by three-dimensional measurement;

a step of acquiring, as a second offset amount, an offset amount of the center position of the groove portion from the virtual center axis of the diaphragm in the horizontal direction; and a step of designing the center guide pin based on the first offset amount and the second offset amount such that a position of the diaphragm in the horizontal direction in a state where the diaphragm is incorporated in the casing is within a tolerance determined with respect to the casing.

2. The design method of a center guide pin according to claim 1, further comprising:

a step of setting a casing reference plane, which is a virtual plane on the casing dividing surface, by measuring the casing dividing surface by three-dimensional measurement, wherein, in the step of acquiring the first offset amount, the virtual center axis of the casing and the center position of the center guide pin are projected on the casing reference plane to acquire the first offset amount.

3. The design method of a center guide pin according to claim 1, further comprising:

a step of setting a diaphragm reference plane, which is a virtual plane on the diaphragm dividing surface, by measuring the diaphragm dividing surface by three-dimensional measurement, wherein, in the step of acquiring the second offset amount, the virtual center axis of the diaphragm and the center position of the groove portion are projected on the diaphragm reference plane to acquire the second offset amount.

4. The design method of a center guide pin according to claim 1, wherein the center guide pin includes a positioning portion that is disposed inside the groove portion in a state of being fixed to the casing, and in the step of acquiring the center position of the center guide pin, an outer shape of the positioning portion is measured at an intermediate position of the positioning portion in the axial direction.

5. The design method of a center guide pin according to claim 1, wherein the casing has a plurality of seal fixing surfaces to which seal members sealing a space between the casing and the outer peripheral surface of the rotor and formed in an annular shape are fixed, and in the step of setting the virtual center axis of the casing, the plurality of center points of the casing are acquired by measuring the plurality of seal fixing surfaces by three-dimensional measurement.

6. The design method of a center guide pin according to claim 1, wherein, in the step of setting the virtual center axis of the diaphragm, a plurality of the outer peripheral surfaces of the diaphragm are measured at different positions in the axial direction.

7. The design method of a center guide pin according to claim 1, wherein, in the step of acquiring the center position of the groove portion, the shape of the groove portion is measured at an intermediate position of the groove portion in the axial direction.

8. A manufacturing method of a center guide pin, the manufacturing method comprising:

a step of manufacturing the center guide pin designed by the design method of a center guide pin according to claim 1.

9. An assembling method of a rotary machine, the assembling method comprising:

a step of fixing the center guide pin manufactured by the manufacturing method of a center guide pin according to claim 8 to the inner peripheral surface of the casing; and a step of assembling the diaphragm on which the groove portion is formed to the casing and fitting the center guide pin into the groove portion.

* * * * *